United States Patent
Taherzadeh Boroujeni et al.

(10) Patent No.: US 11,956,044 B2
(45) Date of Patent: Apr. 9, 2024

(54) DYNAMIC ADAPTATION OF SEMI-PERSISTENT CSI REPORT SETTING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Jelena Damnjanovic, Del Mar, CA (US); Junyi Li, Fairless Hills, PA (US); Iyab Issam Sakhnini, San Diego, CA (US); Jing Sun, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/317,613

(22) Filed: May 11, 2021

(65) Prior Publication Data

US 2021/0359743 A1    Nov. 18, 2021

Related U.S. Application Data

(60) Provisional application No. 63/024,369, filed on May 13, 2020.

(51) Int. Cl.
| | | |
|---|---|---|
| *H04B 7/06* | (2006.01) | |
| *H04L 1/00* | (2006.01) | |
| *H04W 72/1268* | (2023.01) | |
| *H04W 72/23* | (2023.01) | |
| *H04W 72/54* | (2023.01) | |

(52) U.S. Cl.
CPC ......... *H04B 7/0626* (2013.01); *H04L 1/0003* (2013.01); *H04W 72/1268* (2013.01); *H04W 72/23* (2023.01); *H04W 72/54* (2023.01)

(58) Field of Classification Search
CPC  H04B 7/0626; H04W 72/14; H04W 72/1226; H04W 72/1268; H04L 1/0003
See application file for complete search history.

(56) References Cited

U.S. PATENT DOCUMENTS

| | | | |
|---|---|---|---|
| 10,306,429 B2 | 5/2019 | Kim et al. | |
| 10,938,537 B2 * | 3/2021 | Rico Alvarino | H04L 1/0003 |
| 11,006,445 B2 * | 5/2021 | Zhou | H04L 5/0048 |
| 11,026,257 B2 * | 6/2021 | Sarkis | H04L 5/0055 |

(Continued)

FOREIGN PATENT DOCUMENTS

WO    WO-2021163162 A1 *  8/2021  ........... H04L 1/0026

*Primary Examiner* — Parth Patel
(74) *Attorney, Agent, or Firm* — Holland & Hart LLP

(57) ABSTRACT

Methods, systems, and devices for wireless communications are described. In some systems, a user equipment (UE) may transmit a number of channel state information (CSI) reports for a CSI reporting procedure as part of a beam management procedure. The UE may transmit a first number of CSI reports of the CSI reporting procedure to the base station using a first set of transmission parameters associated with a first reliability level. The base station may transmit a control message to the UE indicating a second set of transmission parameters associated with a second reliability level and the UE may transmit a second number of CSI reports of the CSI reporting procedure to the base station using the second set of transmission parameters.

27 Claims, 18 Drawing Sheets

(56) References Cited

U.S. PATENT DOCUMENTS

| | | | | |
|---|---|---|---|---|
| 11,283,541 B2* | 3/2022 | Guan | | H04L 5/0057 |
| 11,330,569 B2* | 5/2022 | Kundu | | H04L 1/1819 |
| 2007/0253411 A1* | 11/2007 | Arad | | H04L 47/2441 |
| | | | | 370/428 |
| 2009/0157900 A1* | 6/2009 | Ge | | H04L 69/167 |
| | | | | 709/236 |
| 2010/0272036 A1* | 10/2010 | Ramakrishna | | H04L 5/0039 |
| | | | | 370/329 |
| 2010/0284314 A1* | 11/2010 | Pelletier | | H04L 47/30 |
| | | | | 375/295 |
| 2011/0083035 A1* | 4/2011 | Liu | | H04W 72/005 |
| | | | | 714/E11.071 |
| 2011/0249643 A1* | 10/2011 | Barbieri | | H04W 24/10 |
| | | | | 370/328 |
| 2012/0127869 A1* | 5/2012 | Yin | | H04W 28/06 |
| | | | | 370/252 |
| 2013/0148613 A1* | 6/2013 | Han | | H04L 1/1671 |
| | | | | 370/329 |
| 2013/0242778 A1* | 9/2013 | Geirhofer | | H04L 5/0057 |
| | | | | 370/252 |
| 2013/0336244 A1* | 12/2013 | Kuo | | H04L 27/2601 |
| | | | | 370/328 |
| 2014/0133395 A1* | 5/2014 | Nam | | H04B 7/0452 |
| | | | | 370/328 |
| 2015/0029971 A1* | 1/2015 | Nishio | | H04W 72/0406 |
| | | | | 370/329 |
| 2015/0207604 A1* | 7/2015 | Sun | | H04B 7/0626 |
| | | | | 370/329 |
| 2015/0319753 A1* | 11/2015 | Chen | | H04L 5/001 |
| | | | | 370/329 |
| 2016/0100382 A1* | 4/2016 | He | | H04L 5/001 |
| | | | | 370/329 |
| 2016/0198020 A1* | 7/2016 | Zhao | | H04L 69/166 |
| | | | | 709/223 |
| 2016/0295573 A1* | 10/2016 | Lee | | H04L 5/001 |
| 2016/0365944 A1* | 12/2016 | Blankenship | | H04W 4/70 |
| 2017/0230913 A1* | 8/2017 | Ouchi | | H04W 74/0833 |
| 2017/0244513 A1* | 8/2017 | Pitakdumrongkija | | |
| | | | | H04B 7/0452 |
| 2017/0273056 A1* | 9/2017 | Papasakellariou | | H04W 52/325 |
| 2017/0288808 A1* | 10/2017 | Blankenship | | H04W 72/0446 |
| 2017/0289953 A1* | 10/2017 | Chae | | G01S 1/042 |
| 2018/0049047 A1* | 2/2018 | Lin | | H04L 5/0007 |
| 2018/0083684 A1* | 3/2018 | He | | H04B 7/0626 |
| 2018/0234870 A1* | 8/2018 | Lee | | H04W 72/0406 |
| 2018/0279145 A1* | 9/2018 | Jung | | H04L 5/0051 |
| 2018/0287757 A1* | 10/2018 | Onggosanusi | | H04L 5/0048 |
| 2018/0343653 A1* | 11/2018 | Guo | | H04W 72/1273 |
| 2019/0037608 A1* | 1/2019 | Harada | | H04W 16/14 |
| 2019/0069285 A1* | 2/2019 | Chandrasekhar | | H04B 7/088 |
| 2019/0098523 A1* | 3/2019 | Muruganathan | | H04L 5/0092 |
| 2019/0149365 A1* | 5/2019 | Chatterjee | | H04L 5/0048 |
| | | | | 370/329 |
| 2019/0174466 A1* | 6/2019 | Zhang | | H04L 5/0057 |
| 2019/0182807 A1* | 6/2019 | Panteleev | | H04W 72/042 |
| 2019/0215781 A1* | 7/2019 | Jeon | | H04W 24/10 |
| 2019/0222400 A1* | 7/2019 | Bagheri | | H04L 5/0082 |
| 2019/0246395 A1* | 8/2019 | Huang | | H04W 72/042 |
| 2019/0306842 A1* | 10/2019 | Cirik | | H04B 7/0617 |
| 2019/0342874 A1* | 11/2019 | Davydov | | H04W 72/0413 |
| 2019/0349061 A1* | 11/2019 | Cirik | | H04L 5/005 |
| 2019/0356438 A1* | 11/2019 | Lee | | H04B 7/0695 |
| 2019/0357185 A1* | 11/2019 | Kwak | | H04L 1/0075 |
| 2020/0021419 A1* | 1/2020 | Taherzadeh Boroujeni | | |
| | | | | H04L 5/0053 |
| 2020/0052846 A1* | 2/2020 | Takeda | | H04L 5/0048 |
| 2020/0084006 A1* | 3/2020 | Rahman | | H04L 5/0057 |
| 2020/0092894 A1* | 3/2020 | Zhang | | H04W 72/085 |
| 2020/0118544 A1* | 4/2020 | Lee | | G10L 15/063 |
| 2020/0163081 A1* | 5/2020 | Kim | | H04W 72/0413 |
| 2020/0163156 A1* | 5/2020 | Ye | | H04W 8/24 |
| 2020/0177254 A1* | 6/2020 | Lee | | H04B 7/0632 |
| 2020/0213069 A1* | 7/2020 | Jiang | | H04L 5/0098 |
| 2020/0221428 A1* | 7/2020 | Moon | | H04W 16/28 |
| 2020/0244331 A1* | 7/2020 | Karri | | H04B 7/0473 |
| 2020/0259625 A1* | 8/2020 | Papasakellariou | | H04L 1/08 |
| 2020/0304192 A1* | 9/2020 | Yum | | H04L 1/0069 |
| 2020/0383119 A1* | 12/2020 | Sun | | H04L 1/0026 |
| 2021/0006315 A1* | 1/2021 | Wu | | H04L 1/0073 |
| 2021/0022129 A1* | 1/2021 | Yuan | | H04L 5/0094 |
| 2021/0058967 A1* | 2/2021 | Oteri | | H04W 72/042 |
| 2021/0184819 A1* | 6/2021 | Takeda | | H04W 24/10 |
| 2021/0258966 A1* | 8/2021 | Yoshioka | | H04W 72/0413 |
| 2021/0351825 A1* | 11/2021 | Zhang | | H04L 5/005 |
| 2021/0359743 A1* | 11/2021 | Taherzadeh Boroujeni | | |
| | | | | H04W 72/1268 |
| 2021/0385842 A1* | 12/2021 | Zhao | | H04L 5/0092 |
| 2021/0409991 A1* | 12/2021 | Park | | H04L 5/0048 |
| 2022/0030443 A1* | 1/2022 | Chen | | H04W 72/0446 |
| 2022/0039100 A1* | 2/2022 | Yoshioka | | H04W 72/042 |
| 2022/0124711 A1* | 4/2022 | Zhou | | H04W 28/26 |
| 2022/0158712 A1* | 5/2022 | Zhang | | H04B 7/0608 |
| 2022/0166480 A1* | 5/2022 | Park | | H04B 7/0628 |
| 2022/0166539 A1* | 5/2022 | Bergman | | H04L 1/08 |
| 2022/0264343 A1* | 8/2022 | Guo | | H04W 24/08 |
| 2022/0295303 A1* | 9/2022 | Takada | | H04B 7/088 |

* cited by examiner

DYNAMIC ADAPTATION OF SEMI-PERSISTENT CSI REPORT SETTING

CROSS REFERENCE

The present application for patent claims the benefit of U.S. Provisional Patent Application No. 63/024,369 by TAHERZADEH BOROUJENI et al., entitled "DYNAMIC ADAPTATION OF SEMI-PERSISTENT CSI REPORT SETTING," filed May 13, 2020, assigned to the assignee hereof, and expressly incorporated by reference herein.

FIELD OF TECHNOLOGY

The following relates generally to wireless communications and more specifically to dynamic adaptation of a semi-persistent channel state information (CSI) report setting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station and a user equipment (UE) may support beamforming techniques and may communicate using one or more directional beams. To maintain reliable communications between the base station and the UE, the base station and the UE may perform a beam management procedure. In performing the beam management procedure, the UE may measure one or more reference signals transmitted by the base station corresponding to one or more beams and the UE may generate a channel state information (CSI) report based on the measured reference signals.

SUMMARY

The described techniques relate to improved methods, systems, devices, and apparatuses that support dynamic adaptation of a semi-persistent channel state information (CSI) report setting. Generally, the described techniques provide for more reliable and enhanced coverage of CSI reporting procedures between a base station and a user equipment (UE). In some examples, to achieve more reliable CSI reporting, the base station and the UE may support a dynamic adaptation of a set of transmission parameters used for a CSI reporting procedure (e.g., a semi-persistent reporting procedure) as part of a beam management procedure. For example, the base station may configure a first set of transmission parameters at the UE for the CSI reporting procedure and, based on an amount of data to be transmitted, a changing link condition, or a changing coverage area or coverage condition, the base station may dynamically indicate a second set of transmission parameters at the UE that the UE may use to transmit one or more subsequent or remaining CSI reports of the CSI reporting procedure.

The base station may signal the dynamic indication via a control message, such as downlink control information (DCI) or a medium access control (MAC) control element (CE). The second set of transmission parameters may include or otherwise indicate a number of repetitions (e.g., a repetition level), a set of time and frequency resources, a payload size, a code rate or a modulation and coding scheme (MCS), a configured uplink grant, or any combination thereof. In some examples, the base station may transmit the control message (e.g., the dynamic indication) to configure the UE in a coverage enhancement mode and, as such, the second set of transmission parameters may be associated with a higher reliability level than the first set of transmission parameters. Accordingly, based on communicating the number of CSI reports using the second set of transmission parameters, the base station and the UE may increase the reliability and the coverage of CSI reporting between the base station and the UE. The reliability of the beam management procedure may likewise increase, which may further result in more optimal beam selections by the base station.

A method of wireless communications at a UE is described. The method may include transmitting, to a base station, a first one or more CSI reports according to a first set of transmission parameters associated with a first reliability level for a CSI reporting procedure, receiving, from the base station, a control message indicating a second set of transmission parameters associated with a second reliability level for the CSI reporting procedure, and transmitting, to the base station, a second one or more CSI reports according to the second set of transmission parameters.

An apparatus for wireless communications at a UE is described. The apparatus may include a processor, memory coupled with the processor, and instructions stored in the memory. The instructions may be executable by the processor to cause the apparatus to transmit, to a base station, a first one or more CSI reports according to a first set of transmission parameters associated with a first reliability level for a CSI reporting procedure, receive, from the base station, a control message indicating a second set of transmission parameters associated with a second reliability level for the CSI reporting procedure, and transmit, to the base station, a second one or more CSI reports according to the second set of transmission parameters.

Another apparatus for wireless communications at a UE is described. The apparatus may include means for transmitting, to a base station, a first one or more CSI reports according to a first set of transmission parameters associated with a first reliability level for a CSI reporting procedure, receiving, from the base station, a control message indicating a second set of transmission parameters associated with a second reliability level for the CSI reporting procedure, and transmitting, to the base station, a second one or more CSI reports according to the second set of transmission parameters.

A non-transitory computer-readable medium storing code for wireless communications at a UE is described. The code may include instructions executable by a processor to transmit, to a base station, a first one or more CSI reports according to a first set of transmission parameters associated with a first reliability level for a CSI reporting procedure, receive, from the base station, a control message indicating a second set of transmission parameters associated with a second reliability level for the CSI reporting procedure, and transmit, to the base station, a second one or more CSI reports according to the second set of transmission parameters.

Some examples of the method, apparatuses, and non-transitory computer-readable medium described herein may further include operations, features, means, or instructions for identifying, based on receiving the control message, a number of repetitions for each CSI report of the second one or more CSI reports, where the second set of transmission parameters include an indication of the number of repetitions, where the second one or more CSI reports may be transmitted according to the identified number of repetitions.

In some examples of the method, apparatuses, and non-transitory computer-readable medium described herein, identifying the number of repetitions may include operations, features, means, or instructions for identifying the number of repetitions for each CSI report of the second one or more CSI reports based on a bit value, where the indication of the number of repetitions includes the bit value.

In some examples of the method, apparatuses, and non-transitory computer-readable medium described herein, a first value of the bit value corresponds to a first configuration associated with a first number of repetitions, and a second value of the bit value corresponds to a second configuration associated with a second number of repetitions.

In some examples of the method, apparatuses, and non-transitory computer-readable medium described herein, identifying the number of repetitions may include operations, features, means, or instructions for identifying the number of repetitions for each CSI report of the second one or more CSI reports based on an index value, where the indication of the number of repetitions includes the index value.

Some examples of the method, apparatuses, and non-transitory computer-readable medium described herein may further include operations, features, means, or instructions for identifying, based on the index value, an entry of a table stored at the UE, where identifying the number of repetitions for each CSI report of the second one or more CSI reports may be based on identifying the entry to the table.

In some examples of the method, apparatuses, and non-transitory computer-readable medium described herein, the table includes a set of entries, each entry of the set of entries corresponding to a different number of repetitions.

Some examples of the method, apparatuses, and non-transitory computer-readable medium described herein may further include operations, features, means, or instructions for receiving, from the base station, the table via radio resource control signaling, or signaling associated with activating the CSI reporting procedure, or in the control message.

In some examples of the method, apparatuses, and non-transitory computer-readable medium described herein, the table may be pre-configured at the UE.

In some examples of the method, apparatuses, and non-transitory computer-readable medium described herein, identifying the number of repetitions may include operations, features, means, or instructions for identifying the number of repetitions for each CSI report of the second one or more CSI reports based on a number of bits, where the indication of the number of repetitions includes the number of bits.

Some examples of the method, apparatuses, and non-transitory computer-readable medium described herein may further include operations, features, means, or instructions for identifying a first set of time and frequency resources for the first one or more CSI reports, the first set of transmission parameters including the first set of time and frequency resources, and identifying, based on receiving the control message, a second set of time and frequency resources for the second one or more CSI reports, the second set of transmission parameters including the second set of time and frequency resources.

In some examples of the method, apparatuses, and non-transitory computer-readable medium described herein, transmitting the second one or more CSI reports may include operations, features, means, or instructions for transmitting the second one or more CSI reports using the first set of time and frequency resources and the second set of time and frequency resources, where the second set of time and frequency resources may be an additional set of time and frequency resources for the second one or more CSI reports.

In some examples of the method, apparatuses, and non-transitory computer-readable medium described herein, transmitting the second one or more CSI reports may include operations, features, means, or instructions for transmitting the second one or more CSI reports using the second set of time and frequency resources without using the first set of time and frequency resources, where the second set of time and frequency resources may be an alternative set of time and frequency resources for the second one or more CSI reports.

In some examples of the method, apparatuses, and non-transitory computer-readable medium described herein, a first size of the first set of time and frequency resources may be less than a second size of the second set of time and frequency resources.

Some examples of the method, apparatuses, and non-transitory computer-readable medium described herein may further include operations, features, means, or instructions for identifying a first payload size for the first one or more CSI reports, the first set of transmission parameters including the first payload size, and identifying, based on receiving the control message, a second payload size for the second one or more CSI reports, the second set of transmission parameters including the second payload size.

Some examples of the method, apparatuses, and non-transitory computer-readable medium described herein may further include operations, features, means, or instructions for identifying one or both of a first code rate or a first MCS for the first one or more CSI reports, the first set of transmission parameters including one or both of the first code rate or the first MCS, and identifying, based on receiving the control message, one or both of a second code rate or a second MCS for the second one or more CSI reports, the second set of transmission parameters including one or both of the second code rate or the second MCS.

Some examples of the method, apparatuses, and non-transitory computer-readable medium described herein may further include operations, features, means, or instructions for identifying a first uplink grant for the first one or more CSI reports, the first set of transmission parameters including the first uplink grant, and identifying, based on receiving the control message, a second uplink grant for the second one or more CSI reports, the second set of transmission parameters including the second uplink grant.

Some examples of the method, apparatuses, and non-transitory computer-readable medium described herein may further include operations, features, means, or instructions for identifying, based on receiving the control message, a number of repetitions for each CSI report of the second one or more CSI reports, where the second set of transmission parameters include an indication of the number of repetitions, and transmitting the second one or more CSI reports according to the number of repetitions using the second uplink grant.

Some examples of the method, apparatuses, and non-transitory computer-readable medium described herein may further include operations, features, means, or instructions for receiving, from the base station, signaling indicating one or more uplink grants including at least the second uplink grant, and identifying the second uplink grant from the one or more uplink grants based on an indication received from the base station.

In some examples of the method, apparatuses, and non-transitory computer-readable medium described herein, the one or more uplink grants may be received via radio resource control (RRC) signaling.

Some examples of the method, apparatuses, and non-transitory computer-readable medium described herein may further include operations, features, means, or instructions for receiving, from the base station, the indication via the control message.

Some examples of the method, apparatuses, and non-transitory computer-readable medium described herein may further include operations, features, means, or instructions for receiving, from the base station, the indication via signaling associated with activating the CSI reporting procedure.

Some examples of the method, apparatuses, and non-transitory computer-readable medium described herein may further include operations, features, means, or instructions for receiving, from the base station, the indication via higher layer signaling associated with configuring the CSI reporting procedure.

In some examples of the method, apparatuses, and non-transitory computer-readable medium described herein, the indication includes an index value corresponding to the second uplink grant.

In some examples of the method, apparatuses, and non-transitory computer-readable medium described herein, the second uplink grant may be different than the first uplink grant.

In some examples of the method, apparatuses, and non-transitory computer-readable medium described herein, the control message includes DCI or a MAC-CE.

In some examples of the method, apparatuses, and non-transitory computer-readable medium described herein, the control message triggers a coverage enhancement mode at the UE.

In some examples of the method, apparatuses, and non-transitory computer-readable medium described herein, the CSI reporting procedure includes semi-persistent CSI reporting.

In some examples of the method, apparatuses, and non-transitory computer-readable medium described herein, the control message may be received during a time duration configured for the semi-persistent CSI reporting.

In some examples of the method, apparatuses, and non-transitory computer-readable medium described herein, the CSI reporting procedure may be part of a beam management procedure.

A method of wireless communications at a base station is described. The method may include receiving, from a UE, a first one or more CSI reports according to a first set of transmission parameters associated with a first reliability level for a CSI reporting procedure, transmitting, to the UE, a control message indicating a second set of transmission parameters associated with a second reliability level for the CSI reporting procedure, and receiving, from the UE, a second one or more CSI reports according to the second set of transmission parameters.

An apparatus for wireless communications at a base station is described. The apparatus may include a processor, memory coupled with the processor, and instructions stored in the memory. The instructions may be executable by the processor to cause the apparatus to receive, from a UE, a first one or more CSI reports according to a first set of transmission parameters associated with a first reliability level for a CSI reporting procedure, transmit, to the UE, a control message indicating a second set of transmission parameters associated with a second reliability level for the CSI reporting procedure, and receive, from the UE, a second one or more CSI reports according to the second set of transmission parameters.

Another apparatus for wireless communications at a base station is described. The apparatus may include means for receiving, from a UE, a first one or more CSI reports according to a first set of transmission parameters associated with a first reliability level for a CSI reporting procedure, transmitting, to the UE, a control message indicating a second set of transmission parameters associated with a second reliability level for the CSI reporting procedure, and receiving, from the UE, a second one or more CSI reports according to the second set of transmission parameters.

A non-transitory computer-readable medium storing code for wireless communications at a base station is described. The code may include instructions executable by a processor to receive, from a UE, a first one or more CSI reports according to a first set of transmission parameters associated with a first reliability level for a CSI reporting procedure, transmit, to the UE, a control message indicating a second set of transmission parameters associated with a second reliability level for the CSI reporting procedure, and receive, from the UE, a second one or more CSI reports according to the second set of transmission parameters.

Some examples of the method, apparatuses, and non-transitory computer-readable medium described herein may further include operations, features, means, or instructions for identifying a number of repetitions for each CSI report of the second one or more CSI reports, where the second set of transmission parameters include an indication of the number of repetitions, and the second one or more CSI reports may be received according to the number of repetitions.

In some examples of the method, apparatuses, and non-transitory computer-readable medium described herein, identifying the number of repetitions may include operations, features, means, or instructions for identifying a bit value indicating the number of repetitions for each CSI report of the second one or more CSI reports, where the indication of the number of repetitions includes the bit value.

In some examples of the method, apparatuses, and non-transitory computer-readable medium described herein, a first value of the bit value corresponds to a first configuration associated with a first number of repetitions, and a second value of the bit value corresponds to a second configuration associated with a second number of repetitions.

In some examples of the method, apparatuses, and non-transitory computer-readable medium described herein, identifying the number of repetitions may include operations, features, means, or instructions for identifying an index value indicating the number of repetitions for each CSI report of the second one or more CSI reports, where the indication of the number of repetitions includes the index value.

In some examples of the method, apparatuses, and non-transitory computer-readable medium described herein, the index value corresponds to an entry of a table stored at the UE, the table including a set of entries corresponding to different numbers of repetitions.

Some examples of the method, apparatuses, and non-transitory computer-readable medium described herein may further include operations, features, means, or instructions for transmitting, to the UE, the table via RRC signaling, or signaling associated with activating the CSI reporting procedure, or in the control message.

Some examples of the method, apparatuses, and non-transitory computer-readable medium described herein may further include operations, features, means, or instructions for identifying a number of bits indicating the number of repetitions for each CSI report of the second one or more CSI reports, where the indication of the number of repetitions includes the number of bits.

Some examples of the method, apparatuses, and non-transitory computer-readable medium described herein may further include operations, features, means, or instructions for identifying a first set of time and frequency resources for the first one or more CSI reports, the first set of transmission parameters including the first set of time and frequency resources, and identifying a second set of time and frequency resources for the second one or more CSI reports, the second set of transmission parameters including the second set of time and frequency resources.

In some examples of the method, apparatuses, and non-transitory computer-readable medium described herein, receiving the second one or more CSI reports may include operations, features, means, or instructions for receiving the second one or more CSI reports using the first set of time and frequency resources and the second set of time and frequency resources, where the second set of time and frequency resources may be an additional set of time and frequency resources for the second one or more CSI reports.

In some examples of the method, apparatuses, and non-transitory computer-readable medium described herein, receiving the second one or more CSI reports may include operations, features, means, or instructions for receiving the second one or more CSI reports using the second set of time and frequency resources without using the first set of time and frequency resources, where the second set of time and frequency resources may be an alternative set of time and frequency resources for the second one or more CSI reports.

In some examples of the method, apparatuses, and non-transitory computer-readable medium described herein, a first size of the first set of time and frequency resources may be less than a second size of the second set of time and frequency resources.

Some examples of the method, apparatuses, and non-transitory computer-readable medium described herein may further include operations, features, means, or instructions for identifying a first payload size for the first one or more CSI reports, the first set of transmission parameters including the first payload size, and identifying a second payload size for the second one or more CSI reports, the second set of transmission parameters including the second payload size.

Some examples of the method, apparatuses, and non-transitory computer-readable medium described herein may further include operations, features, means, or instructions for identifying one or both of a first code rate or a first MCS for the first one or more CSI reports, the first set of transmission parameters including one or both of the first code rate or the first MCS, and identifying one or both of a second code rate or a second MCS for the second one or more CSI reports, the second set of transmission parameters including one or both of the second code rate or the second MCS.

Some examples of the method, apparatuses, and non-transitory computer-readable medium described herein may further include operations, features, means, or instructions for identifying a first uplink grant for the first one or more CSI reports, the first set of transmission parameters including the first uplink grant, and identifying a second uplink grant for the second one or more CSI reports, the second set of transmission parameters including the second uplink grant.

Some examples of the method, apparatuses, and non-transitory computer-readable medium described herein may further include operations, features, means, or instructions for identifying a number of repetitions for each CSI report of the second one or more CSI reports, where the second set of transmission parameters include an indication of the number of repetitions, and receiving the second one or more CSI reports according to the number of repetitions using the second uplink grant.

Some examples of the method, apparatuses, and non-transitory computer-readable medium described herein may further include operations, features, means, or instructions for transmitting, to the UE, signaling indicating one or more uplink grants including at least the second uplink grant, and transmitting, to the UE, an indication of the second uplink grant of the one or more uplink grants.

In some examples of the method, apparatuses, and non-transitory computer-readable medium described herein, the one or more uplink grants may be transmitted via RRC signaling.

Some examples of the method, apparatuses, and non-transitory computer-readable medium described herein may further include operations, features, means, or instructions for transmitting, to the UE, the indication via the control message.

Some examples of the method, apparatuses, and non-transitory computer-readable medium described herein may further include operations, features, means, or instructions for transmitting, to the UE, the indication via signaling associated with activating the CSI reporting procedure.

Some examples of the method, apparatuses, and non-transitory computer-readable medium described herein may further include operations, features, means, or instructions for transmitting, to the UE, the indication via higher layer signaling associated with configuring the CSI reporting procedure.

In some examples of the method, apparatuses, and non-transitory computer-readable medium described herein, the indication includes an index value corresponding to the second uplink grant.

In some examples of the method, apparatuses, and non-transitory computer-readable medium described herein, the second uplink grant may be different than the first uplink grant.

In some examples of the method, apparatuses, and non-transitory computer-readable medium described herein, the control message includes DCI or a MAC-CE.

In some examples of the method, apparatuses, and non-transitory computer-readable medium described herein, the control message triggers a coverage enhancement mode at the UE.

In some examples of the method, apparatuses, and non-transitory computer-readable medium described herein, the CSI reporting procedure includes semi-persistent CSI reporting.

In some examples of the method, apparatuses, and non-transitory computer-readable medium described herein, the control message may be received during a time duration configured for the semi-persistent CSI reporting.

In some examples of the method, apparatuses, and non-transitory computer-readable medium described herein, the CSI reporting procedure may be part of a beam management procedure.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
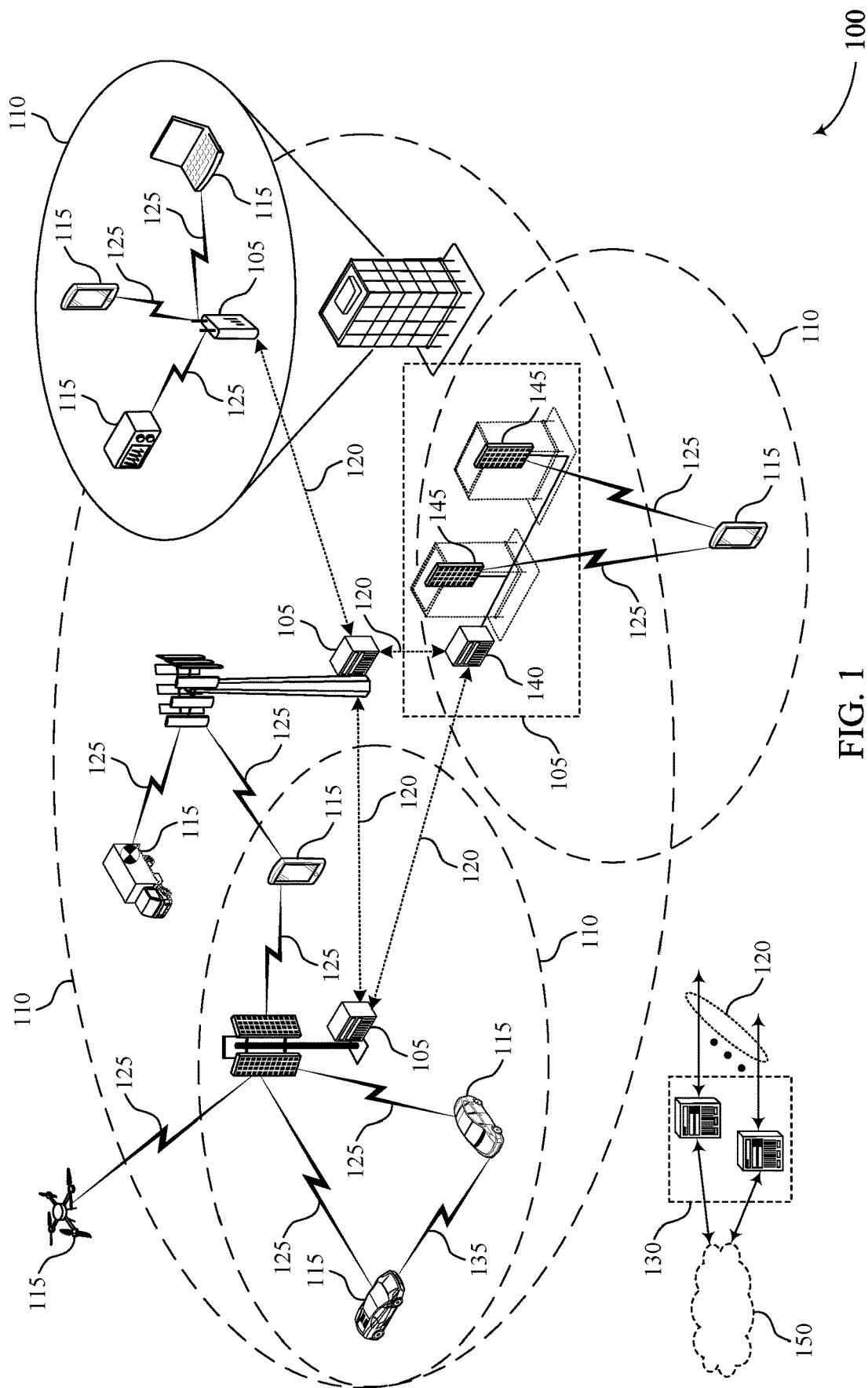
FIG. 1 illustrates an example of a wireless communications system that supports dynamic adaptation of a semi-persistent channel state information (CSI) report setting in accordance with aspects of the present disclosure.

In some wireless communications systems, a base station and a user equipment (UE) may support beamforming techniques and may communicate using one or more directional beams. For example, the base station may unicast to the UE using a directional beam. To maintain reliable communications between the base station and the UE, the base station and the UE may perform a beam management procedure. In performing the beam management procedure, the UE may measure one or more reference signals transmitted by the base station corresponding to one or more beams and the UE may generate a channel state information (CSI) report based on the measured reference signals. In some cases, a CSI report may include beam management information for a number of beams (e.g., up to four beams) and the UE may transmit multiple CSI reports as part of a CSI reporting procedure to provide beam management information to the base station for each of the one or more beams that the base station and the UE may use for directional communications. The UE may transmit the CSI reports using a set of transmission parameters initially configured for the CSI reporting procedure, which may be referred to herein as a first set of transmission parameters.

Each CSI report of the CSI reporting procedure may include a number of different fields. In some cases, the fields of a CSI report including the beam management information may have a large payload size, which may result in poor coverage of the uplink channel carrying the CSI report and poor reliability of the CSI report when transmitted using the first set of transmission parameters. For example, the base station may have a low likelihood of successfully receiving the CSI report based on the poor coverage of the uplink channel carrying the CSI report. In some cases, the base station may unsuccessfully receive the CSI report from the UE. In such cases, the base station may be unable to determine beam management information for each supported beam and, as such, the base station may sub-optimally select a beam for communicating with the UE, which may decrease the reliability of the beam management procedure. Alternatively, the beam management procedure may fail based on the unsuccessful transmission of the CSI report.

In some implementations of the present disclosure, the base station and the UE may dynamically adapt or modify the set of transmission parameters used to transmit the CSI reports of the CSI reporting procedure to increase the coverage and the reliability of the CSI reports. For example, the base station may dynamically indicate a set of transmission parameters, which may be referred to herein as a second set of transmission parameters, during the CSI reporting procedure (e.g., during a semi-persistent CSI reporting procedure). The base station may transmit the dynamic indication in a control message, such as in downlink control information (DCI) or a medium access control (MAC) control element (CE), and the control message may include a field or a number of bits indicating the second set of transmission parameters that the UE may use for CSI reporting (e.g., subsequent CSI reporting). In some examples, the second set of transmission parameters may be associated with a higher reliability level than the first set of transmission parameters. As such, the base station and the UE may experience more reliable CSI reporting and therefore more reliable beam management procedures.

Particular aspects of the subject matter described herein may be implemented to realize one or more potential advantages. The described techniques may increase the flexibility of the base station and the UE by enabling dynamic adaptation of a set of transmission parameters that are used by the UE for CSI reporting. Such techniques may increase the likelihood for successful CSI reporting between the base station and the UE by increasing the coverage of the uplink channel carrying CSI reports, which may facilitate more reliable beam management procedures between the base station and the UE. As such, the base station may more optimally select a beam to use for communications between the base station and the UE. The base station and the UE may experience a greater likelihood for successful communications based on a more optimal beam selection, which may lead to greater system throughput, capacity, and spectral efficiency, as well as reduced signaling overhead between the base station and the UE.

Aspects of the disclosure are initially described in the context of wireless communications systems. Aspects are additionally described in the context of a process flow. Aspects of the disclosure are further illustrated by and described with reference to apparatus diagrams, system diagrams, and flowcharts that relate to dynamic adaptation of a semi-persistent CSI report setting.

FIG. 1 illustrates an example of a wireless communications system 100 that supports dynamic adaptation of a semi-persistent CSI report setting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may trigger or activate a CSI reporting procedure at a UE 115. For example, the base station 105 may trigger the CSI reporting procedure at the UE 115 based on performing a beam management procedure. In such examples, the CSI reporting procedure may include transmitting, by the UE 115, one or more CSI reports to the base station including information relating to the beam management procedure. In some cases, the base station 105 may configure the UE 115 with a first set of transmission parameters that the UE 115 may use for CSI reporting during the CSI reporting procedure. Accordingly, the UE 115 may transmit a first number of CSI reports (e.g., one or more CSI reports) according to the first set of transmission parameters.

In some cases, the amount of data in the CSI report, a condition or quality of a link between the base station 105 and the UE 115, or a coverage condition of the UE 115 may vary or otherwise cause the first set of transmission parameters to become sub-optimal. In other words, the first set of transmission parameters may be associated with a poor reliability level based on the amount of data in the CSI report, the condition or quality of the link between the base station 105 and the UE 115, or the coverage condition of the UE 115. As such, in some implementations of the present disclosure, the base station 105 may transmit a control message including or otherwise indicating a second set of transmission parameters for the UE 115 to use for subsequent CSI reporting during the CSI reporting procedure. In some examples, the second set of transmission parameters may be associated with a higher reliability level than the first set of transmission parameters for the amount of data in the CSI report, the condition or quality of the link between the base station 105 and the UE 115, or the coverage condition of the UE 115. Accordingly, the UE 115 may transmit a second number of CSI reports (e.g., one or more CSI reports) according to the second set of transmission parameters.

Figure 2:
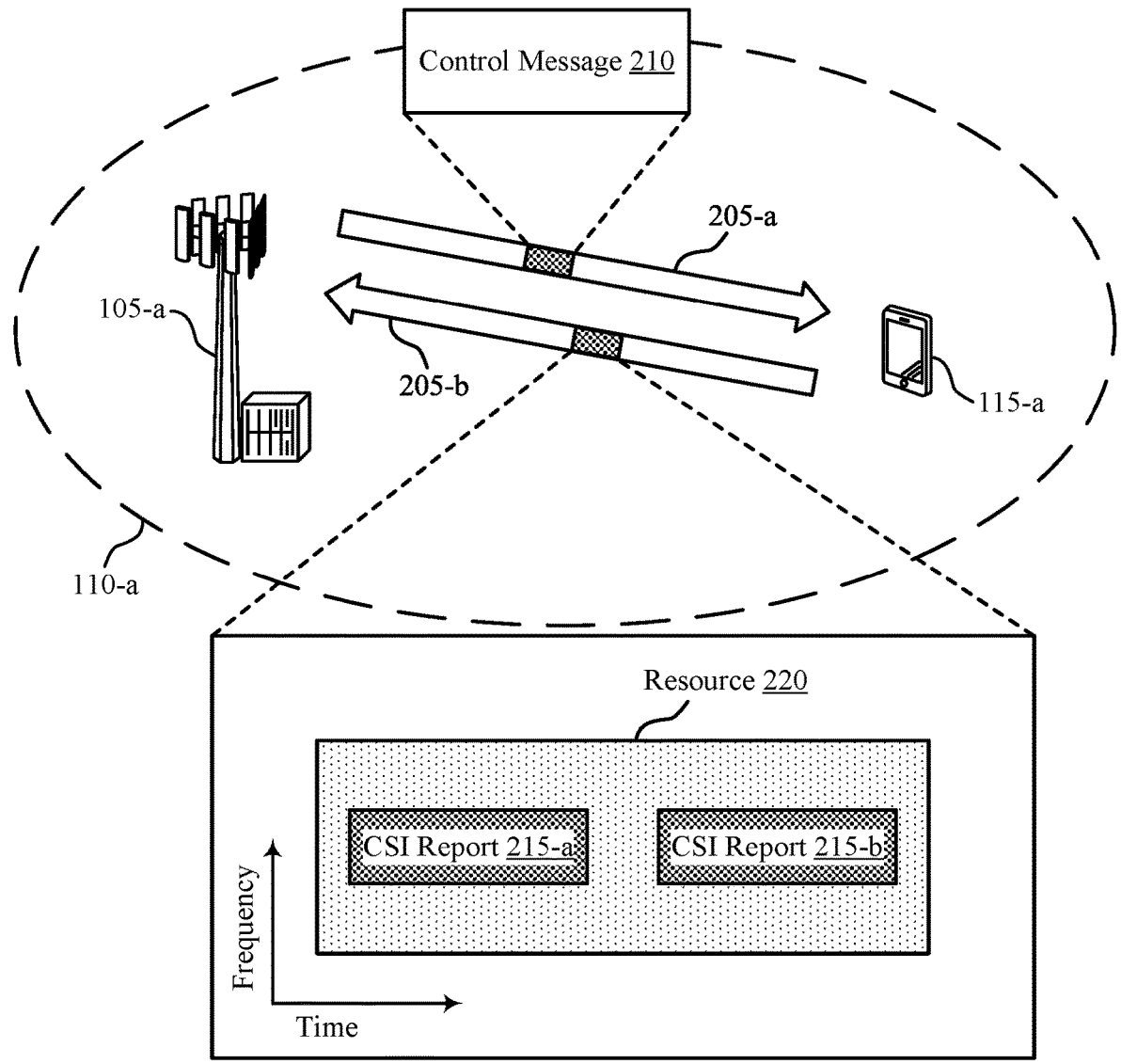
FIG. 2 illustrates an example of a wireless communications system that supports dynamic adaptation of a semi-persistent CSI report setting in accordance with aspects of the present disclosure.

FIG. 2 illustrates an example of a wireless communications system 200 that supports dynamic adaptation of a semi-persistent CSI report setting in accordance with aspects of the present disclosure. In some examples, the wireless communications system 200 may implement aspects of the wireless communications system 100. The wireless communications system 200 may include a base station 105-*a* and a UE 115-*a*, which may be examples of corresponding devices as described herein. The base station 105-*a* and the UE 115-*a* may communicate over a communication link 205 within a coverage area 110-*a*, which may include a downlink communication link 205-*a* and an uplink communication link 205-*b*. In some examples, the base station 105-*a* may dynamically indicate the UE 115-*a* to switch from using a first set of transmission parameters to using a second set of transmission parameters to transmit one or more CSI reports 215 to increase the reliability of a beam management procedure.

In some cases, signals transmitted over the communication link 205 may experience path loss or signal fading, which may reduce the likelihood for successful communications between the base station 105-*a* and the UE 115-*a*. The level of path loss or signal fading experienced by the signals transmitted over the communication link 205 may be based on the radio frequency spectrum band used to transmit the signal and the radio environment in which the signal is transmitted. For example, higher radio frequency spectrum bands may be associated with greater levels of path loss or signal fading. In some cases, the wireless communications system 200 may support wireless communications over high frequency radio frequency spectrum bands, such as millimeter (mmW) radio frequency spectrum bands or FR2 radio frequency spectrum bands and, as such, signals transmitted between the base station 105-*a* and the UE 115-*a* may experience high levels of path loss or signal fading. Additionally or alternatively, the radio environment between the base station 105-*a* and the UE 115-*a* may contribute to the path loss and signal fading experienced by signals transmitted between the base station 105-*a* and the UE 115-*a*. For example, the communication link 205 may experience high levels of interference.

The base station 105-*a* and the UE 115-*a* may support beamforming techniques and may communicate using one or more directional beams to overcome such path loss or signal fading. For instance, the base station 105-*a* and the UE 115-*a* may communicate over a unicast channel (e.g., the communication link 205 may include or be an example of a unicast channel) using one or more directional beams. By employing the use of beamformed transmissions, the base station 105-*a* and the UE 115-*a* may receive signals over the communication link 205 with a greater received signal strength. For example, beamformed transmissions may be less influenced by or less susceptible to the radio environment in which they are transmitted, such as the radio environment including communication link 205.

The quality and reliability of a directional beam used by the base station 105-*a* and the UE 115-*a* may change over time, however. For example, the UE 115-*a* may move (e.g., change physical location) or an obstacle may become present between the base station 105-*a* and the UE 115-*a*, which may influence (e.g., reduce) the quality and reliability of the beam. To maintain a reliable beam for communications between the base station 105-*a* and the UE 115-*a*, the base station 105-*a* and the UE 115-*a* may perform a beam management procedure. In performing a beam management procedure, the base station 105-*a* may transmit one or more reference signals, such as CSI reference signals (CSI-RSs), over one or more beams and the UE 115-*a* may measure the reference signals to determine a quality associated with each of the one or more beams. For each reference signal (e.g., for each beam, where each reference signal corresponds to one beam), the UE 115-*a* may measure a layer 1 reference signal received power (RSRP) to determine a received power, which may be referred to as an L1-RSRP measurement, and a layer 1 signal-to-interference-plus-noise ratio (SINR) to determine a signal-to-noise (SNR) ratio considering the influence of interference, which may be referred to as an L1-SINR measurement.

The UE 115-*a* may transmit an indication of the L1-RSRP and the L1-SINR to the base station in a CSI report 215. One CSI report 215 may include an L1-RSRP and an L1-SINR for a number of different beams (e.g., up to four beams) and may additionally include a number of other fields. For example, a CSI report 215 may include a channel quality indicator (CQI) field, a precoding matrix indicator (PMI) field, a CSI reference signal (CSI-RS) resource indicator (CRI) field, a strongest layer indication (SLI) field, a rank indication (RI) field, a synchronization signal (SS)/physical broadcast channel (PBCH) resource block indicator (SSBRI) field, or any combination thereof, in addition to the L1-RSRP field and the L1-SINR field. In cases where the base station 105-*a* and the UE 115-*a* support more beams than the number of beams that one CSI report 215 may report (e.g., more than four beams), the UE 115-*a* may transmit multiple CSI reports 215. An example of the fields of a CSI report 215 is shown by Table 1.

TABLE 1

CSI Report Fields

| CSI Report Number | CSI Report Fields |
| --- | --- |
| CSI Report #n | CRI or SSBRI #1, if reported |
|  | CRI or SSBRI #2, if reported |
|  | CRI or SSBRI #3, if reported |
|  | CRI or SSBRI #4, if reported |
|  | SINR #1, if reported |
|  | Differential SINR #2, if reported |
|  | Differential SINR #3, if reported |
|  | Differential SINR #4, if reported |

As shown in Table 1, each CSI report 215 may include a number of CRI or SSBRI fields and a number of SINR fields. In some cases, a CSI report 215 may include a report for four beams and may, accordingly, include four CRI or SSBRI fields and four SINR fields (e.g., L1-SINR fields). Although shown in Table 1 including only L1-SINR fields, a CSI report 215 may additionally or alternatively include a number of L1-RSRP fields (e.g., four L1-RSRP fields) in a similar format as shown by Table 1. Further, the CSI report 215 may indicate a portion of the L1-SINR values and the L1-RSRP values associated with each CSI-RS (e.g., each beam) as differential values. As such, the CSI report 215 may include an absolute value for one L1-SINR measurement or one L1-RSRP measurement, or both, and may indicate the remaining L1-SINR measurements or L1-RSRP measurements, or both, as values based on (e.g., relative to) the respective absolute value. For instance, the CSI report 215 may include an absolute L1-SINR value for a first reported beam and include differential L1-SINR values for each remaining beam. In some cases, the first reported beam may be associated with the highest L1-SINR measurement and the differential L1-SINR values for the remaining beams may be determined (e.g., computed) with respect to the highest L1-SINR.

The UE 115-*a* may transmit the CSI report 215 based on the type of CSI reporting procedure used by the base station 105-*a* and the UE 115-*a*. For example, the UE 115-*a* may transmit the CSI report 215 according to a periodic CSI reporting procedure, a semi-persistent CSI reporting procedure, or an aperiodic CSI reporting procedure. In the case that the CSI reporting procedure is periodic, the UE 115-*a* may transmit the CSI report 215 on a physical uplink control channel (PUCCH). For example, the UE 115-*a* may transmit the CSI report 215 on a short PUCCH or a long PUCCH. In the case that the CSI reporting procedure is aperiodic, the UE 115-*a* may transmit the CSI report 215 on a physical uplink shared channel (PUSCH). The PUSCH may be multiplexed with or without uplink data.

In the case that the CSI reporting procedure is semi-persistent, the UE 115-*a* may transmit the CSI report 215 on a long PUCCH or a PUSCH. In some cases, the base station 105-*a* may semi-persistently allocate a set of transmission parameters (e.g., a first set of transmission parameters) on a PUSCH using DCI. As described herein, such a first set of transmission parameters may include or otherwise refer to a first set of time and frequency resources, a first payload size, a first code rate, a first modulation and coding scheme (MCS), or any combination thereof that the UE 115-*a* may use to semi-persistently transmit a first number of CSI reports 215. In some cases, the semi-persistently transmitted CSI reports 215 may support a Type II CSI codebook with a minimum periodicity. In some aspects, the minimum periodicity may be 5 ms. Although the UE 115-*a* may transmit a CSI report 215 (e.g., one single CSI report 215) over multiple uplink reporting instances, the UE 115-*a* may refrain from supporting semi-persistent CSI reporting procedures in the case that the base station 105-*a* transmits aperiodic CSI-RSs. In some cases, the UE 115-*a*, using the periodic CSI reporting procedure or the semi-persistent CSI reporting procedure, may support CSI reporting (e.g., transmissions of CSI reports 215) according to configured periodicities, such as defined by a specification. For instance, the UE 115-*a* may support periodicities of 5 slots, 10 slots, 20 slots, 40 slots, 80 slots, 160 slots, or 320 slots.

As described with reference to Table 1, the CSI report 215 may include differential values, which may reduce the size of the CSI report 215 relative to a CSI report 215 including entirely absolute values. Even in the case of differential L1-SINR reporting or differential L1-RSRP reporting, or both, however, the L1-RSRP field or the L1-SINR field, or both, may be large (e.g., may occupy a large payload size or a large number of bits). For example, even in the case that the CSI report 215 includes differential values for a portion of the L1-RSRP measurements or the L1-SINR measurements, or both, the L1-RSRP report or the L1-SINR report, or both, may exceed a payload size that enables good coverage of the uplink channel carrying the L1-RSRP report or the L1-SINR report, or both (e.g., the L1-RSRP field or the L1-SINR field, or both, may exceed 20 bits). In other words, the size of the CSI report 215 carrying the L1-RSRP field or the L1-SINR field, or both, may be sufficiently large to result in poor coverage of the uplink channel, such as a PUCCH, carrying the L1-RSRP report or the L1-SINR report, or both.

As such, the coverage of the CSI report 215, when transmitted by the UE 115-*a* using the first set of transmission parameters, may be adversely affected by the size of the L1-RSRP field or the L1-SINR field, or both, which may decrease the likelihood of successful reception of the CSI report 215 by the base station 105-*a* and likewise decrease the reliability of the beam management procedure. For example, the beam management procedure may be suboptimal or fail if the CSI report 215 fails to be successfully received by the base station 105-*a*. Further, in the case of some CSI reporting procedures (e.g., periodic and semi-persistent CSI reporting procedures), the UE 115-*a* may be unable to update or modify the transmission parameters to increase the likelihood of successful reception of the CSI report 215. For example, during activity (e.g., an "on" activity) of the CSI reporting procedure, the UE 115-*a* may be unable to use transmission parameters that are different than the initially configured transmission parameters (e.g., the first set of transmission parameters).

In some examples of the present disclosure, the base station 105-*a* may dynamically indicate a second set of transmission parameters to the UE 115-*a* that may increase the coverage of the channel carrying the CSI report 215 and, likewise, increase the reliability of the CSI report 215 and the beam management procedure. For example, the base station 105-*a* may transmit a dynamic indication of the second set of transmission parameters via a control message 210. The UE 115-*a* may identify the second set of transmission parameters based on receiving the control message 210 and the UE 115-*a* may transmit a second number of CSI reports 215, such as a CSI report 215-*a* and a CSI report 215-*b*, according to the second set of transmission parameters. As such, the control message 210, by providing an indication of the second set of transmission parameters that may increase the coverage of the channel carrying a CSI report 215, may trigger a coverage enhancement mode at the UE.

In some aspects, the base station 105-*a* may transmit the control message 210 via DCI or a MAC-CE during the "on" activity of the CSI reporting procedure. In some examples where the control message 210 is transmitted via DCI, the control message 210 may be included in UE-specific DCI or group-common DCI. In cases where the control message 210 is included in UE-specific DCI, the control message 210 may be a field or be indicated by a format of the UE-specific DCI. In cases where the control message 210 is included in group-common DCI, the base station 105-*a* may inform a number of UEs 115-*a* to apply the second set of transmission parameters for all of the CSI reporting procedures that the number of UEs 115-*a* are configured with. In some examples where the control message 210 is transmitted via MAC-CE, the control message 210 may be a downlink packet carried by the MAC-CE.

In some implementations, the second set of transmission parameters may include or otherwise indicate a number of repetitions (e.g., a repetition level, a periodicity for repetitions, a number of resources for repetitions, etc.) that the UE 115-*a* may use to transmit each CSI report 215 of the second number of CSI reports 215. By transmitting each CSI report 215 according to a number of repetitions, the UE 115-*a* may increase the likelihood that the CSI reports 215 will be successfully received by the base station 105-*a*, which may increase the reliability of the beam management procedure. In some examples, the control message 210 may include a flag (e.g., a 1-bit flag) and the UE 115-*a* may identify the number of repetitions to use when transmitting the CSI reports 215 based on the flag. For example, the flag may correspond to a bit in the control message 210 and the UE 115-*a* may determine the number of repetitions based on the value of the bit.

In some examples, for instance, a first value of the bit (e.g., 0) may correspond to a primary configuration associated with a first number of repetitions and a second value of the bit (e.g., 1) may correspond to a secondary configuration associated with a second number of repetitions. In some aspects, the first number of repetitions associated with the primary configuration may be zero. In other words, the UE 115-*a* may refrain from transmitting repetitions of the second number of CSI reports 215 when operating in the primary configuration mode and switch to transmitting repetitions of the second number of CSI reports 215 based on switching to the secondary configuration. In some implementations, the primary configuration and the secondary configuration may be associated with different sets of time and frequency resources. In some aspects, the primary configuration and the secondary configuration may be configured at the UE 115-*a* during an initial configuration of the CSI reporting procedure, such as via a configuration message as described herein, including with reference to FIG. 3.

In some other examples, the control message 210 may include an index value and the UE 115-*a* may identify the number of repetitions based on the index value. For example, the UE 115-*a* may be configured with a set of repetition levels, each repetition level corresponding to a number of repetitions for transmitting each CSI report 215 of the second number of CSI reports 215, and the UE 115-*a* may store the set of repetition levels in a table at the UE 115-*a* (e.g., in a memory of the UE 115-*a*). As such, the UE 115-*a* may identify the number of repetitions based on identifying an entry into the table corresponding to the index value. For instance, the UE 115-*a* may identify an index value of 1 and determine an entry into the table corresponding to the index value of 1, which may indicate two repetitions for each CSI report 215 of the second number of CSI reports 215. In another example, the UE 115-*a* may identify an index value of 2 and determine an entry into the table corresponding to the index value of 2, which may indicate four repetitions of each CSI report 215 of the second number of CSI reports 215.

In some aspects, the base station 105-*a* may signal the table including the set of repetition levels to the UE 115-*a*. For example, the base station 105-*a* may signal the table of repetition levels to the UE 115-*a* in signaling associated with an initial configuration of the CSI reporting procedure, which may be referred to herein as the configuration message, as described in more detail with reference to FIG. 3. In some cases, the signaling may include RRC signaling. In some other aspects, the base station 105-*a* may signal the table of repetition levels to the UE 115-*a* via the DCI that triggers or activates the CSI reporting procedure (e.g., the triggering or activating DCI). In some other aspects, the table may be pre-configured at the UE 115-*a* (e.g., the table may be defined by a specification).

In some other examples, the control message 210 may include a number of bits associated with the number of repetitions and the UE 115-*a* may identify the number of repetitions based on the number of bits. For example, the control message 210 may include an explicit indication of the number of repetitions that the UE 115-*a* may use to transmit each CSI report 215 of the second number of CSI reports 215 and the UE 115-*a* may transmit a number of repetitions for each of the second number of CSI reports 215 based on the explicit indication. In some aspects, regardless of the method used to identify the number of repetitions, the UE 115-*b* may transmit the repetitions of the second number of CSI reports 215 on a PUSCH (e.g., a configured grant).

Additionally or alternatively, the second set of transmission parameters may include or otherwise indicate a second set of time and frequency resources that the UE 115-a may use to transmit each CSI report 215 of the second number of CSI reports 215. In other words, the base station 105-a may transmit an indication of the second set of time and frequency resources in the control message 210 and the UE 115-a may use the second set of time and frequency resources to transmit the second number of CSI reports 215. In some examples, the second set of time and frequency resources indicated by the control message 210 may be resources that the UE 115-a may use in addition to the first set of time and frequency resources to transmit the second number of CSI reports 215. As such, the UE 115-a may use resource 220 to transmit the second number of CSI reports 215 and the resource 220 may include a combination of the first set of time and frequency resources and the second set of time and frequency resources.

In some other examples, the second set of time and frequency resources indicated by the control message 210 may be resources that the UE 115-a may use as an alternative to the first set of time and frequency resources. As such, the UE 115-a may use resource 220 to transmit the second number of CSI reports 215 and the resource 220 may include the second set of time and frequency resources. In such examples, the first set of time and frequency resources may be associated with a first size and the second set of time and frequency resources may be associated with a second size and, in some aspects, the first size may be less than the second size. In other words, the second set of time and frequency resources may occupy a greater quantity of resources. In some cases, transmitting the second number of CSI reports 215 using a greater quantity of resources may increase the coverage of the second number of CSI reports 215 and, likewise, increase the reliability of the beam management procedure. In some implementations, the UE 115-a may determine a number of different parameters based on using the second set of time and frequency resources, such as a different code rate or a different MCS than previously used when transmitting the CSI reports using the first set of time and frequency resources.

Additionally or alternatively, the second set of transmission parameters may include or otherwise indicate a second payload size that the UE 115-a may use to transmit each CSI report 215 of the second number of CSI reports 215. For example, the base station 105-a may transmit an indication of the second payload size in the control message 210 and the UE 115-a may use the second payload size when transmitting the second number of CSI reports 215. In some examples, the second payload size may be larger than the first payload size used to transmit the first number of CSI reports 215 and, as such, may carry the CSI report 215 including the L1-RSRP field or the L1-SINR field, or both, with better coverage and higher reliability than the first payload size, which may increase the reliability of the beam management procedure.

Additionally or alternatively, the second set of transmission parameters may include or otherwise indicate a set of parameters. For example, the second set of transmission parameters may indicate a second code rate or a second MCS, or both, that the UE 115-a may use to transmit the second number of CSI reports 215. In some examples, the parameters indicated by the second set of transmission parameters may increase the likelihood for successful reception of the second number of CSI reports 215 at the base station 105-a, which may increase the reliability of the beam management procedure.

Additionally or alternatively, the UE 115-a may identify a configured grant, such as an uplink grant or a PUSCH, that the UE 115-a may use to transmit the second number of CSI reports 215 or use to transmit a number of repetitions of the second number of CSI reports 215. In other words, in some implementations, the UE 115-a may use the configured grant to transmit the second number of CSI reports 215. In some other implementations, the UE 115-a may use the configured grant to transmit the repetitions of the second number of CSI reports 215, where the configured grant in such implementations is different than the configured grant used for a first transmission of the second number of CSI reports 215. In other words, the UE 115-a may use a first configured grant to transmit a first or an initial transmission of the second number of CSI reports 215 and a second configured grant different than the first configured grant to transmit a number of repetitions of the second number of CSI reports 215 (e.g., the second, the third, etc. transmission of the second number of CSI reports 215). In some aspects, the second set of transmission parameters may include both the first configured grant and the second configured grant.

In some examples, the UE 115-a may be configured with a number of grants (e.g., one or more) and the UE 115-a may determine to use one of the configured grants for repetitions of the second number of CSI reports 215 based on receiving the control message 210. In some aspects, the base station 105-a may configure the number of grants at the UE 115-a via higher layer signaling, such as RRC signaling, and the UE 115-a may store the configured grants in a table at the UE 115-a (e.g., in a memory at the UE 115-a). As such, to inform the UE 115-a of which configured grant of the number of configured grants to use for transmitting the repetitions of the second number of CSI reports 215, the base station 105-a may signal an index value linking the configured grant to the second set of transmission parameters.

In some aspects, the base station 105-a may include the index value corresponding to the configured grant in the initial configuration of the CSI reporting procedure. For example, the base station 105-a may indicate the configured grant in the configuration message used to configure the UE 115-a with the first set of transmission parameters. In such aspects, the UE 115-a may identify the configured grant upon initial configuration of the CSI reporting procedure, but may refrain from using the configured grant until the UE 115-a receives the control message 210 from the base station 105-a indicating the UE 115-a to use the second set of transmission parameters.

In some other aspects, the base station 105-a may include the index value corresponding to the configured grant in the DCI that triggers or activates the CSI reporting procedure. Similarly, although the UE 115-a may identify the configured grant prior to performing the CSI reporting procedure (e.g., or at the beginning of the CSI reporting procedure), the UE 115-a may refrain from using the configured grant until the UE 115-a receives the control message 210 from the base station 105-a indicating the UE 115-a to use the second set of transmission parameters. In some other aspects, the base station 105-a may include the index value corresponding to the configured grant in the control message 210. As such, the UE 115-a may identify the configured grant based on receiving the control message 210 and may use the configured grant in accordance with the specific implementation (e.g., for transmitting the second number of CSI reports 215 or for transmitting a number of repetitions of the second number of CSI reports 215).

Figure 3:
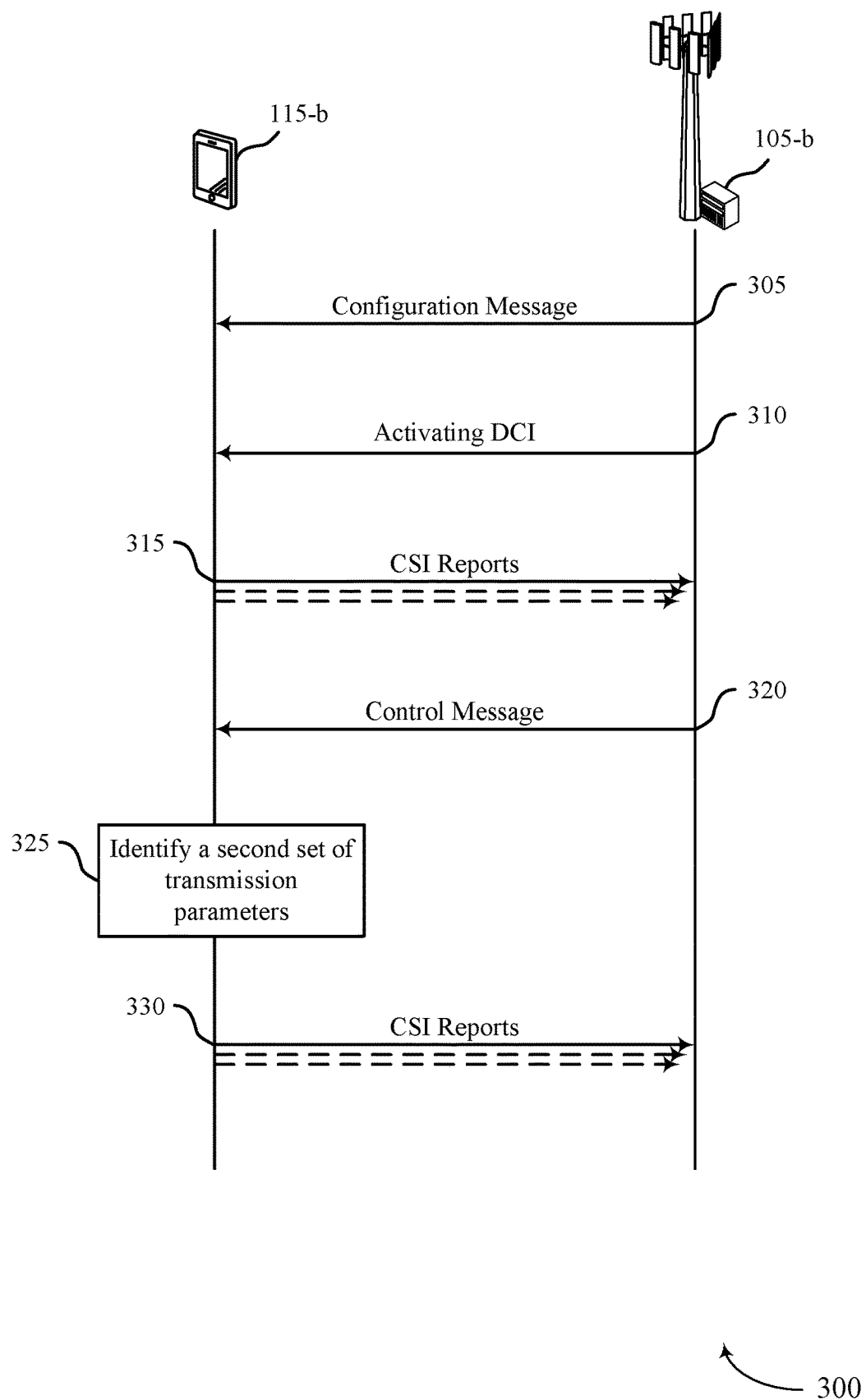
FIG. 3 illustrates an example of a process flow that supports dynamic adaptation of a semi-persistent CSI report setting in accordance with aspects of the present disclosure.

FIG. 3 illustrates an example of a process flow 300 that supports dynamic adaptation of a semi-persistent CSI report setting in accordance with aspects of the present disclosure. In some examples, the process flow 300 may implement aspects of the wireless communications system 100 or the wireless communications system 200. The process flow 300 may illustrate communications between a base station 105-*b* and a UE 115-*b*, which may be examples of corresponding devices as described herein. In some examples, the base station 105-*b* may dynamically indicate a second set of transmission parameters for the UE 115-*b* to use for transmitting one or more CSI reports during a time duration configured for a CSI reporting procedure. In some aspects, the CSI reporting procedure may be a semi-persistent CSI reporting procedure and may be part of a beam management procedure between the base station 105-*b* and the UE 115-*b*.

At 305, the base station 105-*b* may transmit a configuration message to the UE 115-*b*. The configuration message may include an initial configuration of the CSI reporting procedure. For example, the configuration message may include an indication of a first set of transmission parameters that the UE 115-*b* may use for transmitting one or more CSI reports during activity of the CSI reporting procedure. The first set of transmission parameters may include a first set of time and frequency resources, a first payload size, a first code rate, a first MCS, or any combination thereof. In some implementations, the configuration message may include an index value linking one or more configured grants to the CSI reporting procedure. For example, the configuration may link a first configured grant for transmitting an initial transmission of a number of CSI reports and a second configured grant for transmitting a number of repetitions of the number of CSI reports, as described in more detail herein, including with reference to FIG. 2. Additionally or alternatively, the base station 105-*b*, via the configuration message, may configure a number of grants at the UE 115-*b* and the base station 105-*b* may link one or more of the configured grants for the CSI reporting procedure using other signaling. Additionally or alternatively, the configuration message may, in some implementations, configure a table of a set of repetition levels at the UE 115-*b*, as also described herein, including with reference to FIG. 2.

At 310, the base station 105-*b* may transmit an activating DCI to the UE 115-*b*. Upon reception of the activating DCI from the base station 105-*b*, the UE 115-*b* may determine to perform the CSI reporting procedure. In some examples, the activating DCI may trigger the UE 115-*b* to perform a semi-persistent CSI reporting procedure and the UE 115-*b* may transmit one or more CSI reports in a semi-persistent fashion using the first set of transmission parameters configured at the UE 115-*b* at 305. In some implementations, the activating DCI may include an index value linking one or more configured grants to the CSI reporting procedure. For example, the activating DCI may include an index value corresponding to one or more configured grants that the UE 115-*b* may use for transmitting the one or more CSI reports (e.g., the first number of CSI reports, as described with reference to FIG. 2). In some examples, the activating DCI may indicate a configured grant that the UE 115-*b* may use to transmit a number of CSI reports (e.g., the second number of CSI reports, as described with reference to FIG. 2) or a number of repetitions of the number of CSI reports based on receiving an indication from the base station 105-*b* to use a second set of transmission parameters. In other words, the UE 115-*b* may use the configured grant indicated by the activating DCI upon determining to use the second set of transmission parameters. For instance, the UE 115-*b* may determine to use the configured grant linked by the activating DCI upon reception of the control message at 320.

At 315, the UE 115-*b* may transmit a first number of CSI reports (e.g., a first one or more CSI reports). In some examples, the UE 115-*b* may transmit the first number of CSI reports according to the first set of transmission parameters. The first set of transmission parameters may be associated with a first reliability level for the CSI reporting procedure and, in some cases, the first reliability level may become insufficient to enable successful CSI reporting between the base station 105-*b* and the UE 115-*b*. For instance, the first set of transmission parameters may be associated with a low coverage or a poor reliability based on the size of the CSI report, which may become large when including an L1-RSRP field or an L1-SINR field, or both.

At 320, the base station 105-*b* may transmit, to the UE 115-*b*, a control message indicating a second set of transmission parameters associated with a second reliability level for the CSI reporting procedure. As described herein, the base station 105-*b* may use the control message to dynamically indicate the second set of transmission parameters and, likewise, the UE 115-*b* may use the control message to dynamically adapt the transmission parameters used to transmit the CSI reports of the CSI reporting procedure to the second set of transmission parameters from the first set of transmission parameters. As such, the UE 115-*b* may use the second set of transmission parameters to transmit a second number of CSI reports, where the second number of CSI reports include one or more CSI reports of the CSI reporting procedure that are subsequent to receiving the control message. In some examples, the base station 105-*b* may transmit the control message to the UE 115-*b* during activity of the CSI reporting procedure (e.g., during an "on" activity of the CSI reporting procedure). In examples where the CSI reporting procedure is a semi-persistent CSI reporting procedure, such activity may refer to a time period or a time duration between an initial CSI report and a final CSI report that are allocated semi-persistent resources by the configuration message.

At 325, the UE 115-*b* may identify the second set of transmission parameters based on receiving the control message at 320. In some implementations, the second set of transmission parameters may include an indication of a number of repetitions that the UE 115-*b* may use to transmit each CSI report of the second number of CSI reports (e.g., the second one or more CSI reports). Additionally or alternatively, the second set of transmission parameters may include a second set of time and frequency resources that the UE 115-*b* may use to transmit each CSI report of the second number of CSI reports in addition or as an alternative to the first set of time and frequency resources. Additionally or alternatively, the second set of transmission parameters may include a second payload size and the UE 115-*b* may use the second payload size to transmit each CSI report of the second number of CSI reports. Additionally or alternatively, the second set of transmission parameters may include a second code rate or a second MCS, or both, that the UE 115-*b* may use to transmit each CSI report of the second number of CSI reports.

Additionally or alternatively, the control message may indicate the uplink grant (e.g., the configured grant) by including an index value linking the uplink grant to the second set of transmission parameters. As such, the UE 115-*b* may identify the uplink grant and determine to use the uplink grant for transmitting the second number of CSI reports or for transmitting a number of repetitions of the second number of CSI reports, depending on the implementation. In some examples, the control message may indicate multiple uplink grants and, in such examples, the UE 115-b may use one of the uplink grants for transmitting the second number of CSI reports and another of the uplink grants for transmitting a number of repetitions of the second number of CSI reports. Additional details relating to the indication of the number of repetitions, the second set of time and frequency resources, the second payload size, the second code rate, the second MCS, and the configured grant are described herein, including with reference to FIG. 2.

At 330, the UE 115-b may transmit, to the base station 105-b, the second number of CSI reports according to the second set of transmission parameters. In some examples, transmitting the second number of CSI reports may further include transmitting a number of repetitions of the second number of CSI reports. The base station 105-b may have a greater likelihood of successfully receiving the second number of CSI reports based on using the second set of transmission parameters. For example, the second set of transmission parameters may be better adapted to the amount of data of the CSI reports, the quality or condition of the communication link between the base station 105-b and the UE 115-b, or the coverage condition of the UE 115-b than the first set of transmission parameters. As such, the base station 105-b and the UE 115-b may perform a more reliable CSI reporting procedure and, likewise, a more reliable beam management procedure.

Figure 4:
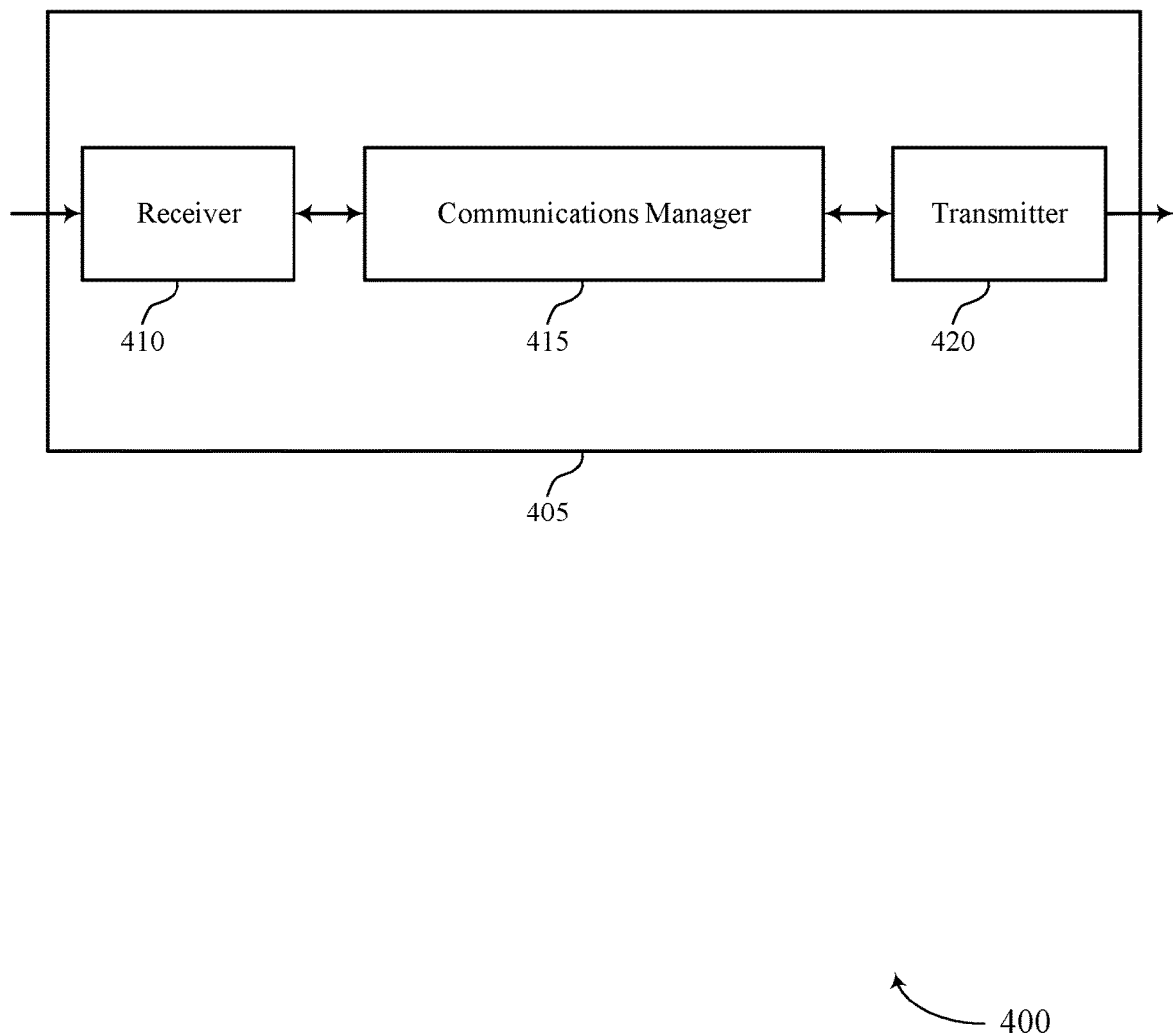
FIGS. 4 and 5 show block diagrams of devices that support dynamic adaptation of a semi-persistent CSI report setting in accordance with aspects of the present disclosure.

FIG. 4 shows a block diagram 400 of a device 405 that supports dynamic adaptation of a semi-persistent CSI report setting in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to dynamic adaptation of a semi-persistent CSI report setting, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit, to a base station, a first one or more CSI reports according to a first set of transmission parameters associated with a first reliability level for a CSI reporting procedure, transmit, to the base station, a second one or more CSI reports according to the second set of transmission parameters, and receive, from the base station, a control message indicating a second set of transmission parameters associated with a second reliability level for the CSI reporting procedure. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and the transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. In some implementations of the present disclosure, the communications manager 415 may enable the device 405 to increase the coverage and reliability of a number of CSI reports as part of a beam management procedure, which may likewise increase the reliability of the beam management procedure. As such, the device 405 may potentially communicate with a base station more successfully based on using a more optimal beam, which may decrease a number of potential retransmissions or a number of monitoring occasions that the device 405 may decode. Accordingly, the device 405 may power off one or more processing units associated with transmitting or decoding monitoring occasions, which may improve power savings at the device 405 and increase battery life.

Figure 5:
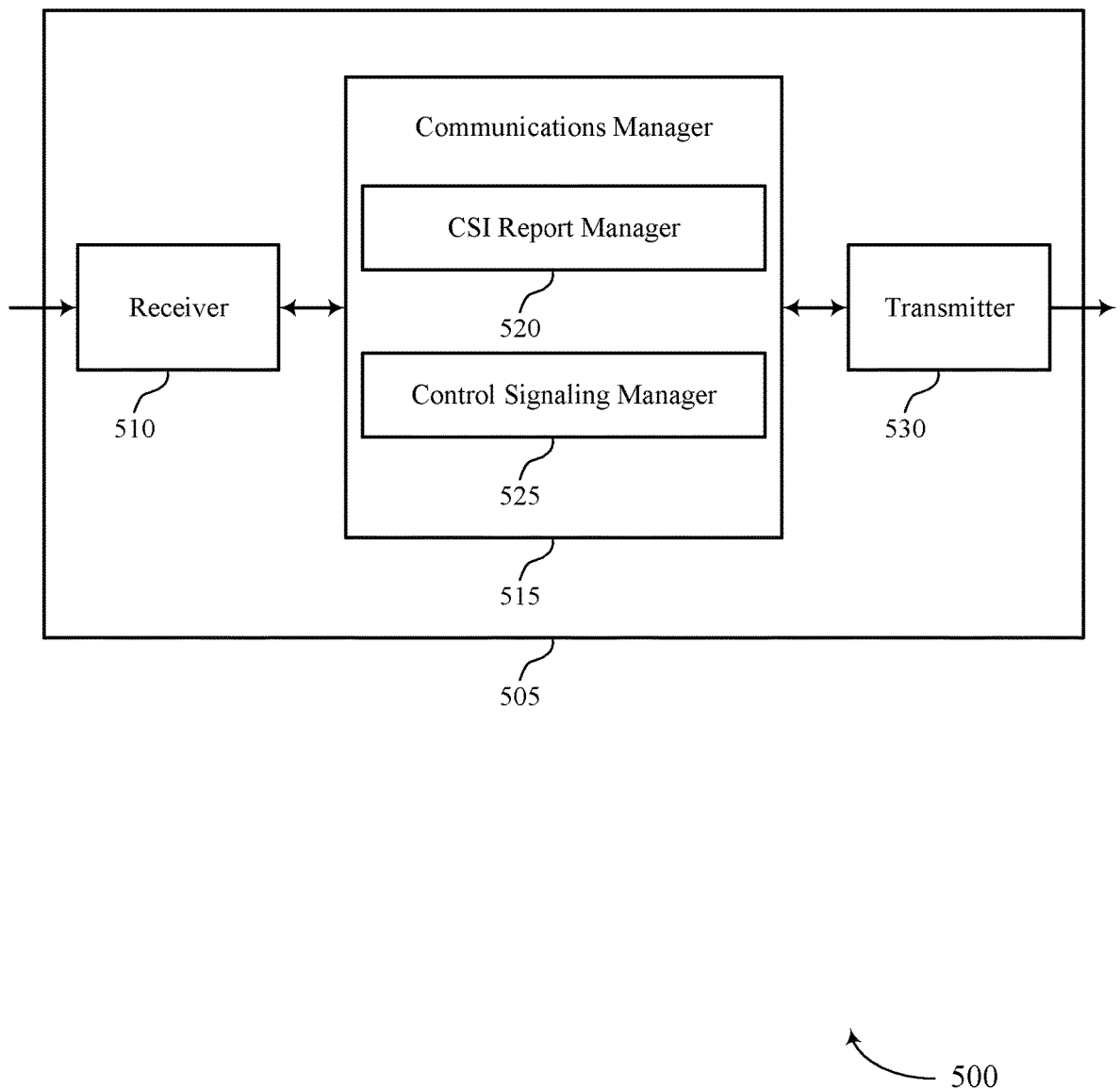

FIG. 5 shows a block diagram 500 of a device 505 that supports dynamic adaptation of a semi-persistent CSI report setting in accordance with aspects of the present disclosure. The device 505 may be an example of aspects of a device 405, or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to dynamic adaptation of a semi-persistent CSI report setting, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a CSI report manager 520 and a control signaling manager 525. The communications manager 515 may be an example of aspects of the communications manager 710 described herein.

The CSI report manager 520 may transmit, to a base station, a first one or more CSI reports according to a first set of transmission parameters associated with a first reliability level for a CSI reporting procedure and transmit, to the base station, a second one or more CSI reports according to the second set of transmission parameters. The control signaling manager 525 may receive, from the base station, a control message indicating a second set of transmission parameters associated with a second reliability level for the CSI reporting procedure.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
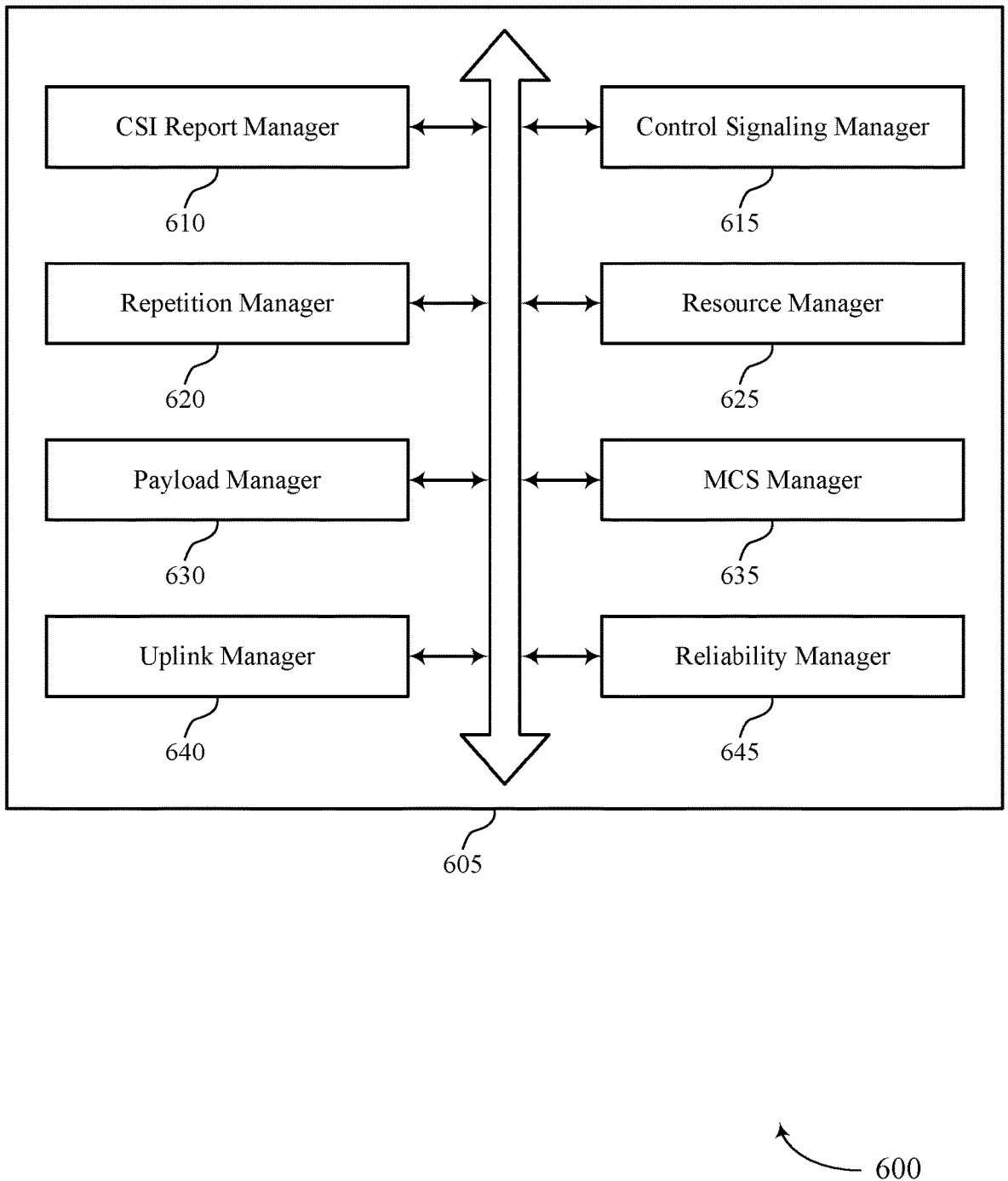
FIG. 6 shows a block diagram of a communications manager that supports dynamic adaptation of a semi-persistent CSI report setting in accordance with aspects of the present disclosure.

FIG. 6 shows a block diagram 600 of a communications manager 605 that supports dynamic adaptation of a semi-persistent CSI report setting in accordance with aspects of the present disclosure. The communications manager 605 may be an example of aspects of a communications manager 415, a communications manager 515, or a communications manager 710 described herein. The communications manager 605 may include a CSI report manager 610, a control signaling manager 615, a repetition manager 620, a resource manager 625, a payload manager 630, an MCS manager 635, an uplink manager 640, and a reliability manager 645. Each of these modules may communicate, directly or indirectly, with one another (e.g., via one or more buses).

The CSI report manager 610 may transmit, to a base station, a first one or more CSI reports according to a first set of transmission parameters associated with a first reliability level for a CSI reporting procedure. In some examples, the CSI report manager 610 may transmit, to the base station, a second one or more CSI reports according to the second set of transmission parameters. In some examples, the CSI report manager 610 may transmit the second one or more CSI reports using the first set of time and frequency resources and the second set of time and frequency resources, where the second set of time and frequency resources are an additional set of time and frequency resources for the second one or more CSI reports.

In some examples, the CSI report manager 610 may transmit the second one or more CSI reports using the second set of time and frequency resources without using the first set of time and frequency resources, where the second set of time and frequency resources are an alternative set of time and frequency resources for the second one or more CSI reports. In some examples, the CSI report manager 610 may transmit the second one or more CSI reports according to the number of repetitions using the second uplink grant.

In some cases, the CSI reporting procedure includes semi-persistent CSI reporting. In some cases, the CSI reporting procedure is part of a beam management procedure.

The control signaling manager 615 may receive, from the base station, a control message indicating a second set of transmission parameters associated with a second reliability level for the CSI reporting procedure. In some cases, the control message includes DCI or a MAC-CE. In some cases, the control message is received during a time duration configured for the semi-persistent CSI reporting.

The repetition manager 620 may identify, based on receiving the control message, a number of repetitions for each CSI report of the second one or more CSI reports, where the second set of transmission parameters include an indication of the number of repetitions, where the second one or more CSI reports are transmitted according to the identified number of repetitions. In some examples, the repetition manager 620 may identify the number of repetitions for each CSI report of the second one or more CSI reports based on a bit value, where the indication of the number of repetitions includes the bit value.

In some examples, the repetition manager 620 may identify the number of repetitions for each CSI report of the second one or more CSI reports based on an index value, where the indication of the number of repetitions includes the index value. In some examples, the repetition manager 620 may identify, based on the index value, an entry of a table stored at the UE, where identifying the number of repetitions for each CSI report of the second one or more CSI reports is based on identifying the entry to the table.

In some examples, the repetition manager 620 may receive, from the base station, the table via RRC signaling, or signaling associated with activating the CSI reporting procedure, or in the control message.

In some examples, the repetition manager 620 may identify the number of repetitions for each CSI report of the second one or more CSI reports based on a number of bits, where the indication of the number of repetitions includes the number of bits. In some examples, the repetition manager 620 may identify, based on receiving the control message, a number of repetitions for each CSI report of the second one or more CSI reports, where the second set of transmission parameters include an indication of the number of repetitions.

In some cases, a first value of the bit value corresponds to a first configuration associated with a first number of repetitions. In some cases, a second value of the bit value corresponds to a second configuration associated with a second number of repetitions. In some cases, the table includes a set of entries, each entry of the set of entries corresponding to a different number of repetitions. In some cases, the table is pre-configured at the UE.

The resource manager 625 may identify a first set of time and frequency resources for the first one or more CSI reports, the first set of transmission parameters including the first set of time and frequency resources. In some examples, the resource manager 625 may identify, based on receiving the control message, a second set of time and frequency resources for the second one or more CSI reports, the second set of transmission parameters including the second set of time and frequency resources. In some cases, a first size of the first set of time and frequency resources is less than a second size of the second set of time and frequency resources.

The payload manager 630 may identify a first payload size for the first one or more CSI reports, the first set of transmission parameters including the first payload size. In some examples, the payload manager 630 may identify, based on receiving the control message, a second payload size for the second one or more CSI reports, the second set of transmission parameters including the second payload size.

The MCS manager 635 may identify one or both of a first code rate or a first MCS for the first one or more CSI reports, the first set of transmission parameters including one or both of the first code rate or the first MCS. In some examples, the MCS manager 635 may identify, based on receiving the control message, one or both of a second code rate or a second MCS for the second one or more CSI reports, the second set of transmission parameters including one or both of the second code rate or the second MCS.

The uplink manager 640 may identify a first uplink grant for the first one or more CSI reports, the first set of transmission parameters including the first uplink grant. In some examples, the uplink manager 640 may identify, based on receiving the control message, a second uplink grant for the second one or more CSI reports, the second set of transmission parameters including the second uplink grant.

In some examples, the uplink manager 640 may receive, from the base station, signaling indicating one or more uplink grants including at least the second uplink grant. In some examples, the uplink manager 640 may identify the second uplink grant from the one or more uplink grants based on an indication received from the base station. In some examples, the uplink manager 640 may receive, from the base station, the indication via the control message.

In some examples, the uplink manager 640 may receive, from the base station, the indication via signaling associated with activating the CSI reporting procedure. In some examples, the uplink manager 640 may receive, from the base station, the indication via higher layer signaling associated with configuring the CSI reporting procedure. In some cases, the one or more uplink grants are received via radio resource control signaling. In some cases, the indication includes an index value corresponding to the second uplink grant. In some cases, the second uplink grant is different than the first uplink grant.

The reliability manager 645 may manage the reliability of a set of transmission parameters used by the device to transmit one or more CSI reports. In some cases, the control message triggers a coverage enhancement mode at the UE.

Figure 7:
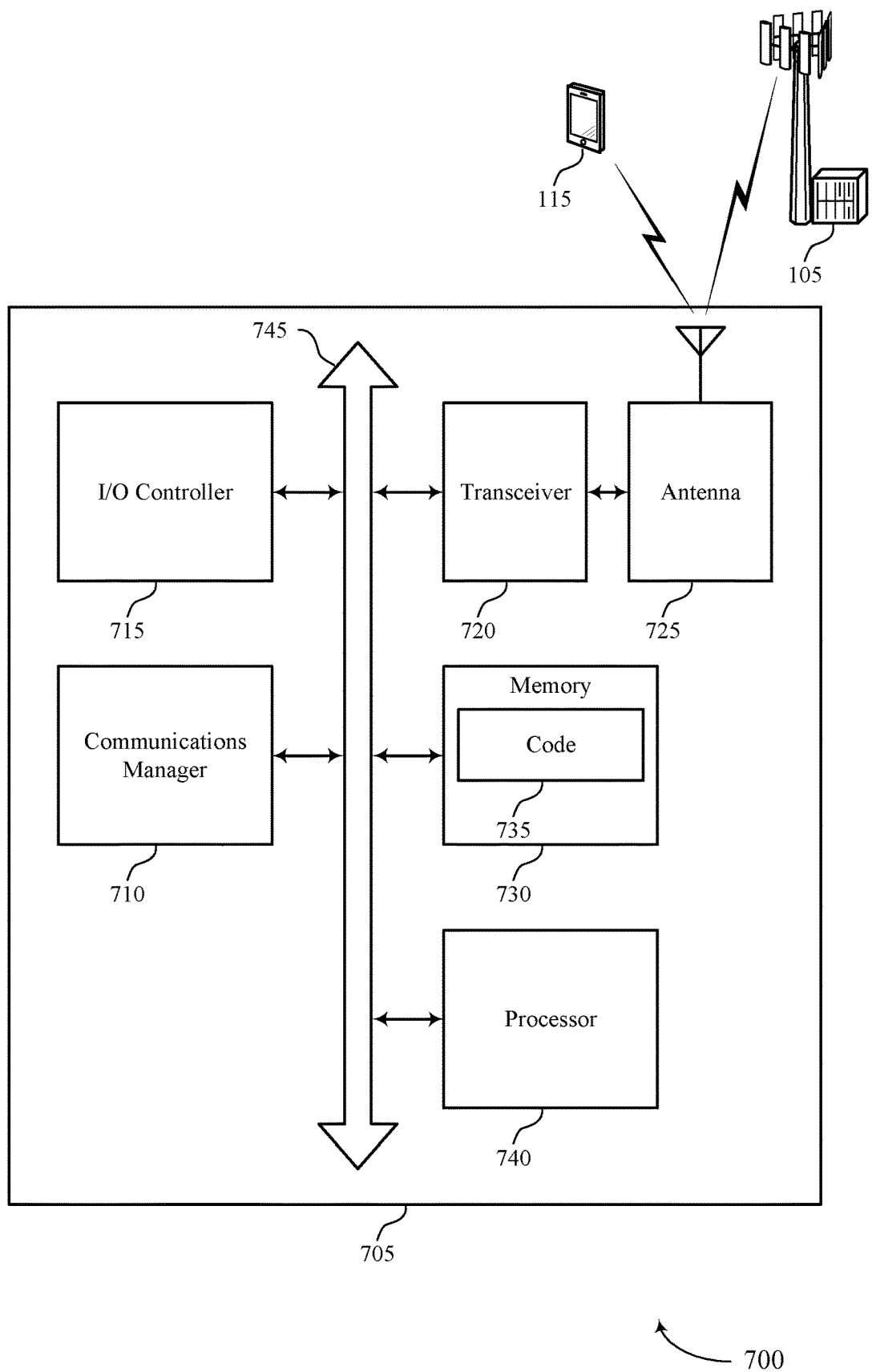
FIG. 7 shows a diagram of a system including a device that supports dynamic adaptation of a semi-persistent CSI report setting in accordance with aspects of the present disclosure.

FIG. 7 shows a diagram of a system 700 including a device 705 that supports dynamic adaptation of a semi-persistent CSI report setting in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, to a base station, a first one or more CSI reports according to a first set of transmission parameters associated with a first reliability level for a CSI reporting procedure, transmit, to the base station, a second one or more CSI reports according to the second set of transmission parameters, and receive, from the base station, a control message indicating a second set of transmission parameters associated with a second reliability level for the CSI reporting procedure.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting dynamic adaptation of a semi-persistent CSI report setting).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
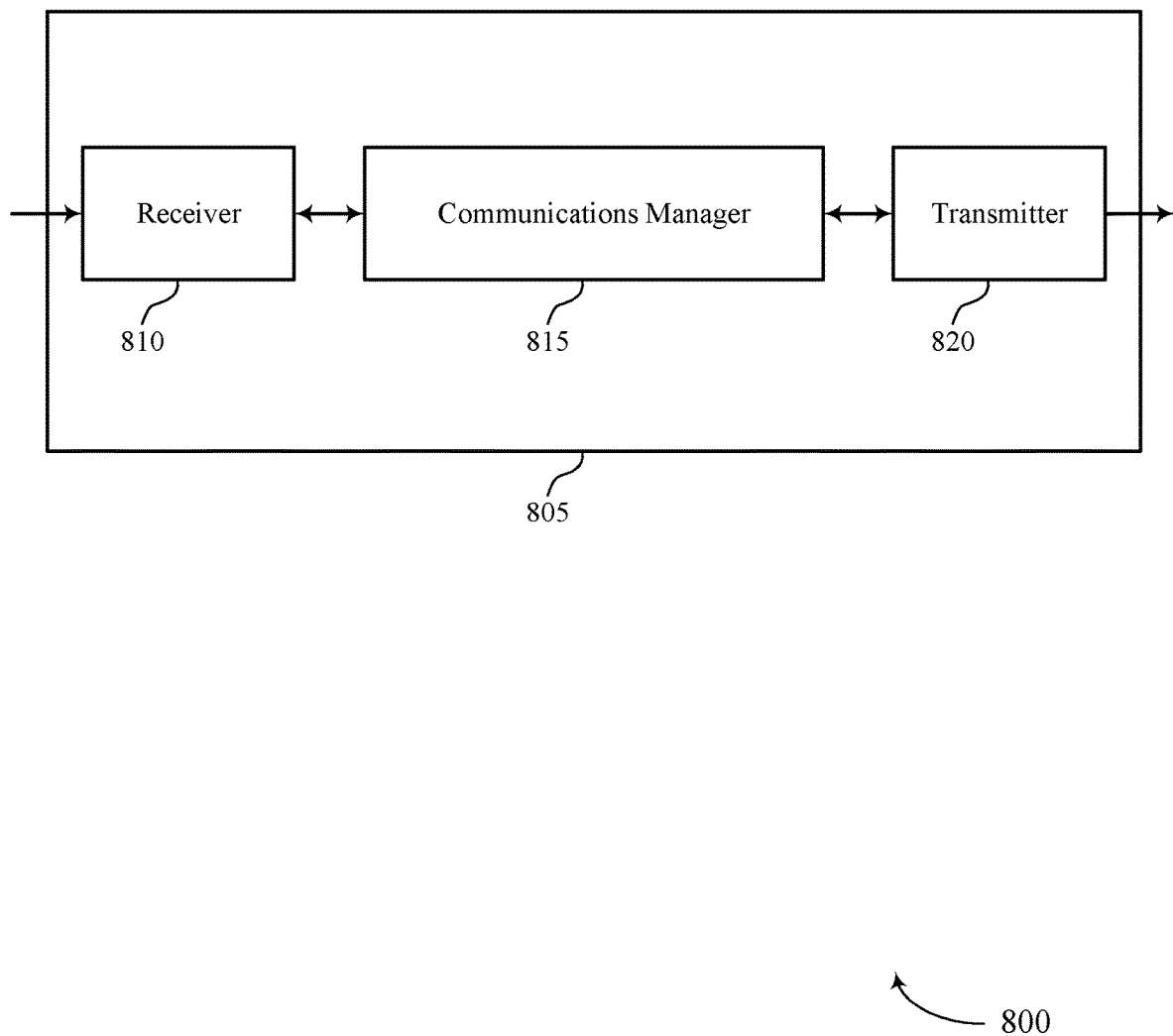
FIGS. 8 and 9 show block diagrams of devices that support dynamic adaptation of a semi-persistent CSI report setting in accordance with aspects of the present disclosure.

FIG. 8 shows a block diagram 800 of a device 805 that supports dynamic adaptation of a semi-persistent CSI report setting in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to dynamic adaptation of a semi-persistent CSI report setting, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a UE, a first one or more CSI reports according to a first set of transmission parameters associated with a first reliability level for a CSI reporting procedure, receive, from the UE, a second one or more CSI reports according to the second set of transmission parameters, and transmit, to the UE, a control message indicating a second set of transmission parameters associated with a second reliability level for the CSI reporting procedure. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

As described herein, the device 805 may transmit a dynamic indication to a UE to adapt a first set of transmission parameters used by the UE to a second set of more optimal transmission parameters that may increase the coverage and reliability of a number of CSI reports transmitted by the UE. As such, the device 805 may have a greater likelihood of successfully receiving the number of CSI reports and the device 805 and the UE may perform a more reliable beam management procedure, which may result in a higher likelihood for successful communications between the device 805 and the UE based on communicating using a more optimal beam. By communicating with the UE using a more optimal beam, the device 805 may achieve greater spectral efficiency and greater system throughput, which may enable the device 805 to allocate more resources to other devices within a wireless communications system and reduce signaling overhead.

Figure 9:
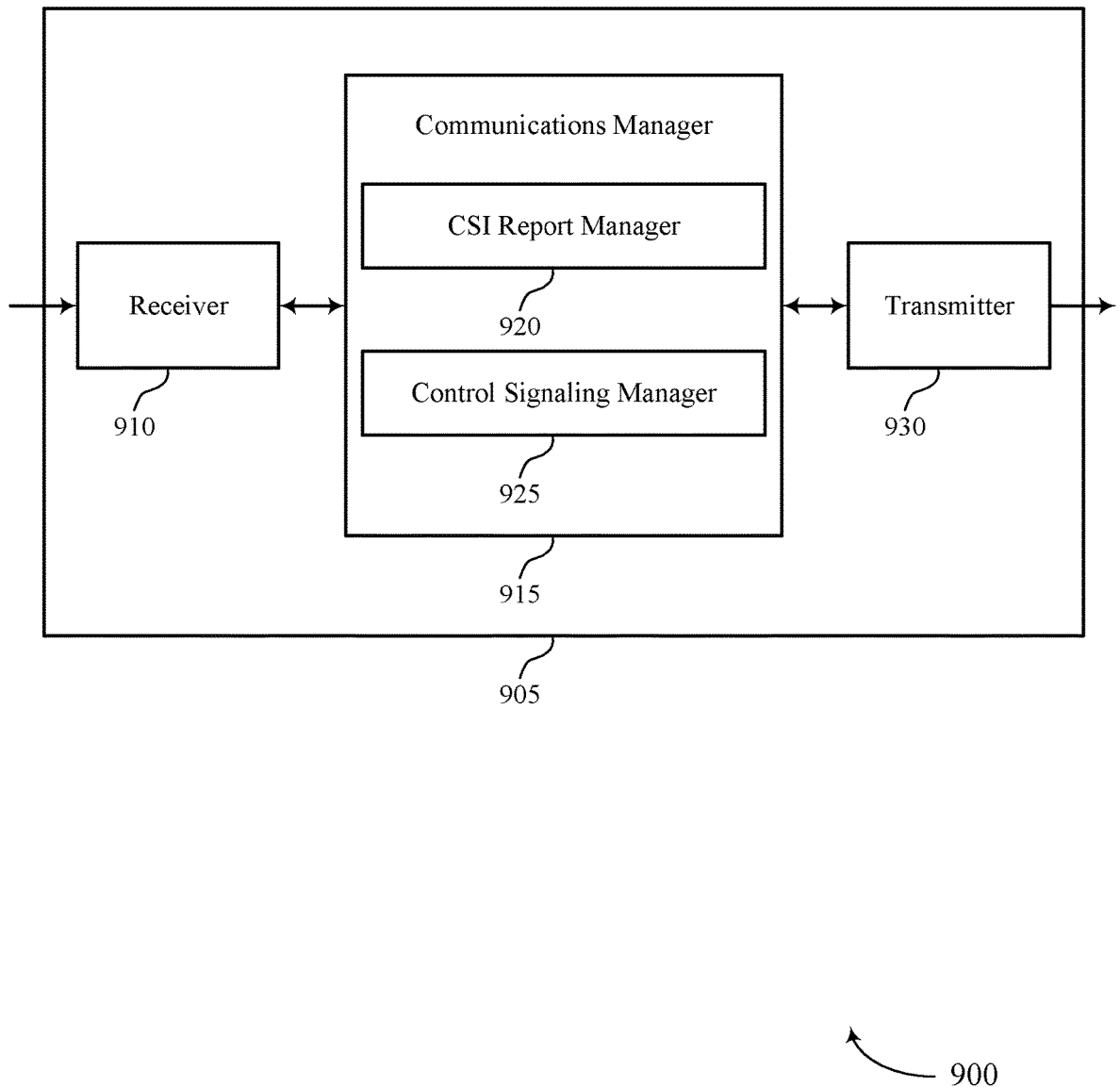

FIG. 9 shows a block diagram 900 of a device 905 that supports dynamic adaptation of a semi-persistent CSI report setting in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to dynamic adaptation of a semi-persistent CSI report setting, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a CSI report manager 920 and a control signaling manager 925. The communications manager 915 may be an example of aspects of the communications manager 1110 described herein.

The CSI report manager 920 may receive, from a UE, a first one or more CSI reports according to a first set of transmission parameters associated with a first reliability level for a CSI reporting procedure and receive, from the UE, a second one or more CSI reports according to the second set of transmission parameters. The control signaling manager 925 may transmit, to the UE, a control message indicating a second set of transmission parameters associated with a second reliability level for the CSI reporting procedure.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
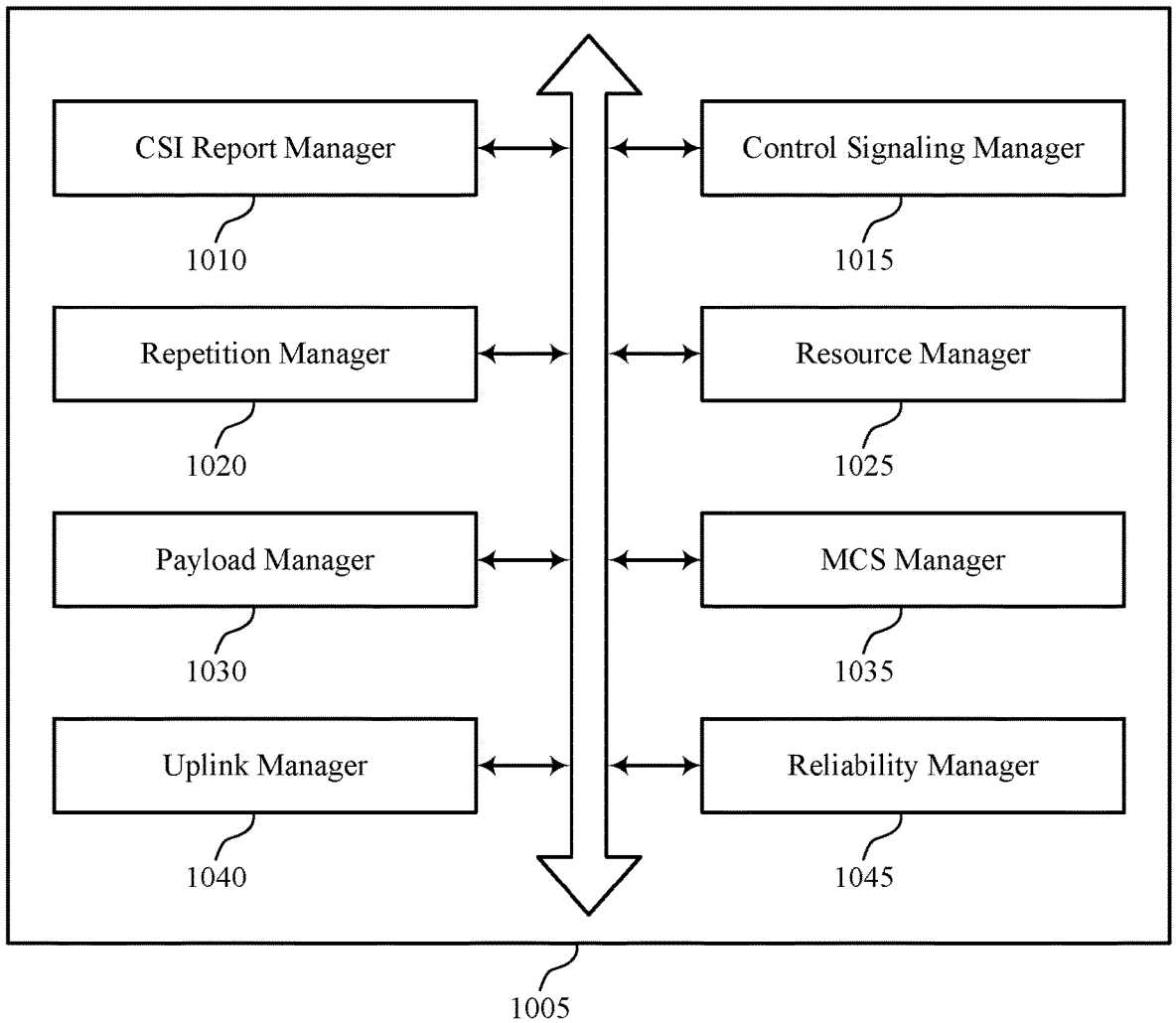
FIG. 10 shows a block diagram of a communications manager that supports dynamic adaptation of a semi-persistent CSI report setting in accordance with aspects of the present disclosure.

FIG. 10 shows a block diagram 1000 of a communications manager 1005 that supports dynamic adaptation of a semi-persistent CSI report setting in accordance with aspects of the present disclosure. The communications manager 1005 may be an example of aspects of a communications manager 815, a communications manager 915, or a communications manager 1110 described herein. The communications manager 1005 may include a CSI report manager 1010, a control signaling manager 1015, a repetition manager 1020, a resource manager 1025, a payload manager 1030, an MCS manager 1035, an uplink manager 1040, and a reliability manager 1045. Each of these modules may communicate, directly or indirectly, with one another (e.g., via one or more buses).

The CSI report manager 1010 may receive, from a UE, a first one or more CSI reports according to a first set of transmission parameters associated with a first reliability level for a CSI reporting procedure. In some examples, the CSI report manager 1010 may receive, from the UE, a second one or more CSI reports according to the second set of transmission parameters. In some examples, the CSI report manager 1010 may receive the second one or more CSI reports using the first set of time and frequency resources and the second set of time and frequency resources, where the second set of time and frequency resources are an additional set of time and frequency resources for the second one or more CSI reports.

In some examples, the CSI report manager 1010 may receive the second one or more CSI reports using the second set of time and frequency resources without using the first set of time and frequency resources, where the second set of time and frequency resources are an alternative set of time and frequency resources for the second one or more CSI reports. In some examples, the CSI report manager 1010 may receive the second one or more CSI reports according to the number of repetitions using the second uplink grant. In some cases, the CSI reporting procedure includes semi-persistent CSI reporting. In some cases, the CSI reporting procedure is part of a beam management procedure.

The control signaling manager 1015 may transmit, to the UE, a control message indicating a second set of transmission parameters associated with a second reliability level for the CSI reporting procedure. In some cases, the control message includes DCI or a MAC-CE. In some cases, the control message is received during a time duration configured for the semi-persistent CSI reporting.

The repetition manager 1020 may identify a number of repetitions for each CSI report of the second one or more CSI reports, where the second set of transmission parameters include an indication of the number of repetitions, and the second one or more CSI reports are received according to the number of repetitions. In some examples, the repetition manager 1020 may identify a bit value indicating the number of repetitions for each CSI report of the second one or more CSI reports, where the indication of the number of repetitions includes the bit value. In some examples, the repetition manager 1020 may identify an index value indicating the number of repetitions for each CSI report of the second one or more CSI reports, where the indication of the number of repetitions includes the index value.

In some examples, the repetition manager 1020 may transmit, to the UE, the table via radio resource control signaling, or signaling associated with activating the CSI reporting procedure, or in the control message. In some examples, the repetition manager 1020 may identify a number of bits indicating the number of repetitions for each CSI report of the second one or more CSI reports, where the indication of the number of repetitions includes the number of bits. In some examples, the repetition manager 1020 may identify a number of repetitions for each CSI report of the second one or more CSI reports, where the second set of transmission parameters include an indication of the number of repetitions.

In some cases, a first value of the bit value corresponds to a first configuration associated with a first number of repetitions. In some cases, a second value of the bit value corresponds to a second configuration associated with a second number of repetitions. In some cases, the index value corresponds to an entry of a table stored at the UE, the table including a set of entries corresponding to different numbers of repetitions.

The resource manager 1025 may identify a first set of time and frequency resources for the first one or more CSI reports, the first set of transmission parameters including the first set of time and frequency resources. In some examples, the resource manager 1025 may identify a second set of time and frequency resources for the second one or more CSI reports, the second set of transmission parameters including the second set of time and frequency resources. In some cases, a first size of the first set of time and frequency resources is less than a second size of the second set of time and frequency resources.

The payload manager 1030 may identify a first payload size for the first one or more CSI reports, the first set of transmission parameters including the first payload size. In some examples, the payload manager 1030 may identify a second payload size for the second one or more CSI reports, the second set of transmission parameters including the second payload size.

The MCS manager 1035 may identify one or both of a first code rate or a first MCS for the first one or more CSI reports, the first set of transmission parameters including one or both of the first code rate or the first MCS. In some examples, the MCS manager 1035 may identify one or both of a second code rate or a second MCS for the second one or more CSI reports, the second set of transmission parameters including one or both of the second code rate or the second MCS.

The uplink manager 1040 may identify a first uplink grant for the first one or more CSI reports, the first set of transmission parameters including the first uplink grant. In some examples, the uplink manager 1040 may identify a second uplink grant for the second one or more CSI reports, the second set of transmission parameters including the second uplink grant.

In some examples, the uplink manager 1040 may transmit, to the UE, signaling indicating one or more uplink grants including at least the second uplink grant. In some examples, the uplink manager 1040 may transmit, to the UE, an indication of the second uplink grant of the one or more uplink grants.

In some examples, the uplink manager 1040 may transmit, to the UE, the indication via the control message. In some examples, the uplink manager 1040 may transmit, to the UE, the indication via signaling associated with activating the CSI reporting procedure. In some examples, the uplink manager 1040 may transmit, to the UE, the indication via higher layer signaling associated with configuring the CSI reporting procedure.

In some cases, the one or more uplink grants are transmitted via radio resource control signaling. In some cases, the indication includes an index value corresponding to the second uplink grant. In some cases, the second uplink grant is different than the first uplink grant.

The reliability manager 1045 may manage the reliability of a set of transmission parameters used by a UE 115 to transmit one or more CSI reports. In some cases, the control message triggers a coverage enhancement mode at the UE.

Figure 11:
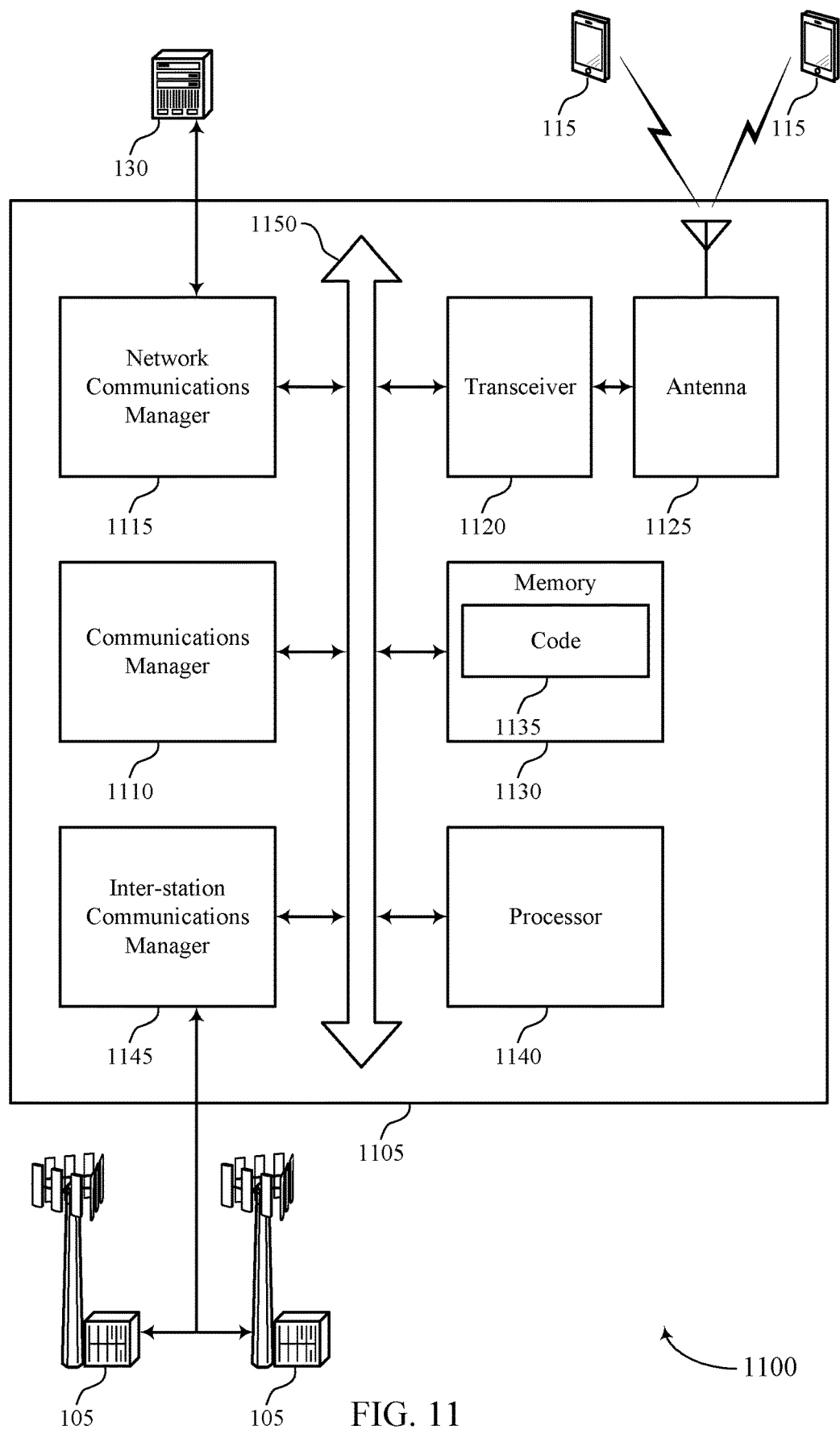
FIG. 11 shows a diagram of a system including a device that supports dynamic adaptation of a semi-persistent CSI report setting in accordance with aspects of the present disclosure.

FIG. 11 shows a diagram of a system 1100 including a device 1105 that supports dynamic adaptation of a semi-persistent CSI report setting in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from a UE, a first one or more CSI reports according to a first set of transmission parameters associated with a first reliability level for a CSI reporting procedure, receive, from the UE, a second one or more CSI reports according to the second set of transmission parameters, and transmit, to the UE, a control message indicating a second set of transmission parameters associated with a second reliability level for the CSI reporting procedure.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting dynamic adaptation of a semi-persistent CSI report setting).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
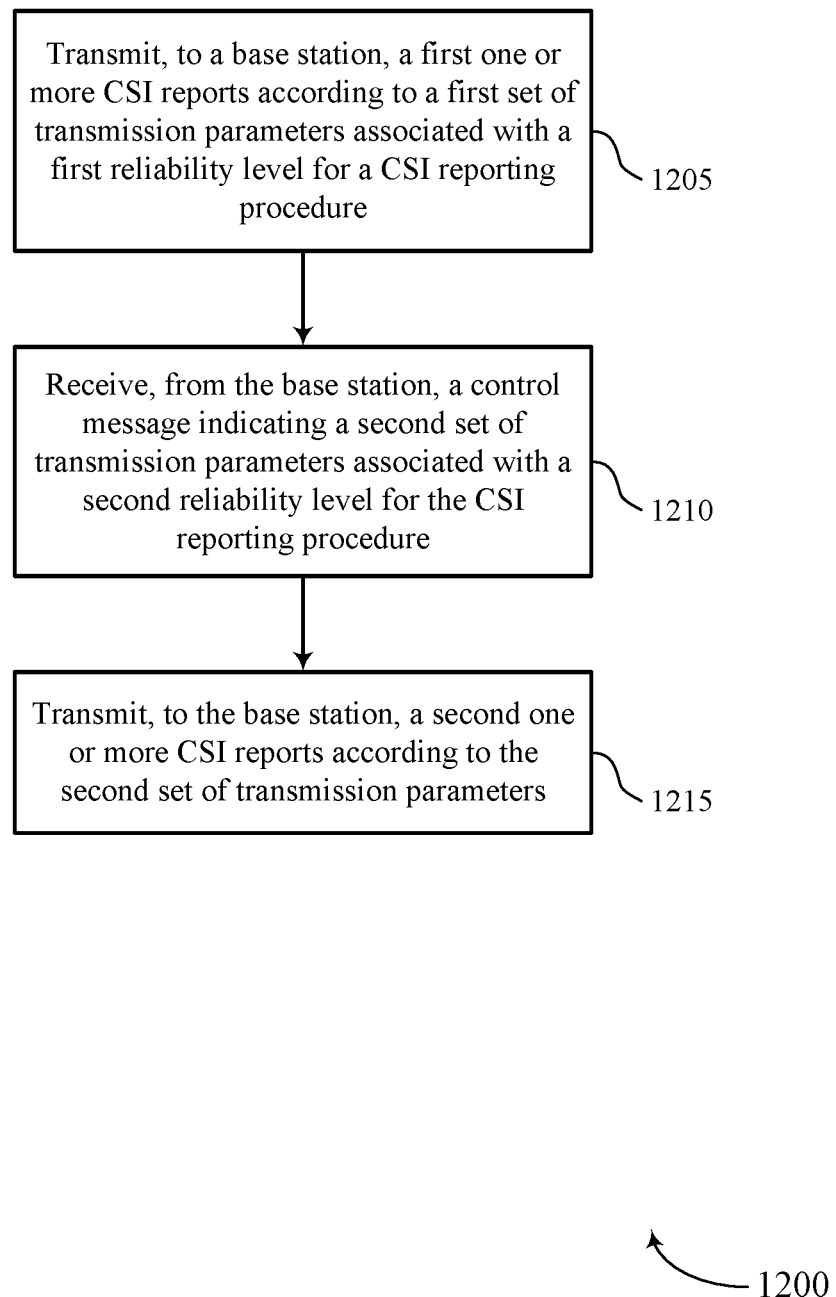
FIGS. 12 through 18 show flowcharts illustrating methods that support dynamic adaptation of a semi-persistent CSI report setting in accordance with aspects of the present disclosure.

FIG. 12 shows a flowchart illustrating a method 1200 that supports dynamic adaptation of a semi-persistent CSI report setting in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may transmit, to a base station, a first one or more CSI reports according to a first set of transmission parameters associated with a first reliability level for a CSI reporting procedure. The operations of 1205 may be performed according to the methods described herein. In some examples, aspects of the operations of 1205 may be performed by a CSI report manager as described with reference to FIGS. 4 through 7.

At 1210, the UE may receive, from the base station, a control message indicating a second set of transmission parameters associated with a second reliability level for the CSI reporting procedure. The operations of 1210 may be performed according to the methods described herein. In some examples, aspects of the operations of 1210 may be performed by a control signaling manager as described with reference to FIGS. 4 through 7.

At 1215, the UE may transmit, to the base station, a second one or more CSI reports according to the second set of transmission parameters. The operations of 1215 may be performed according to the methods described herein. In some examples, aspects of the operations of 1215 may be performed by a CSI report manager as described with reference to FIGS. 4 through 7.

Figure 13:
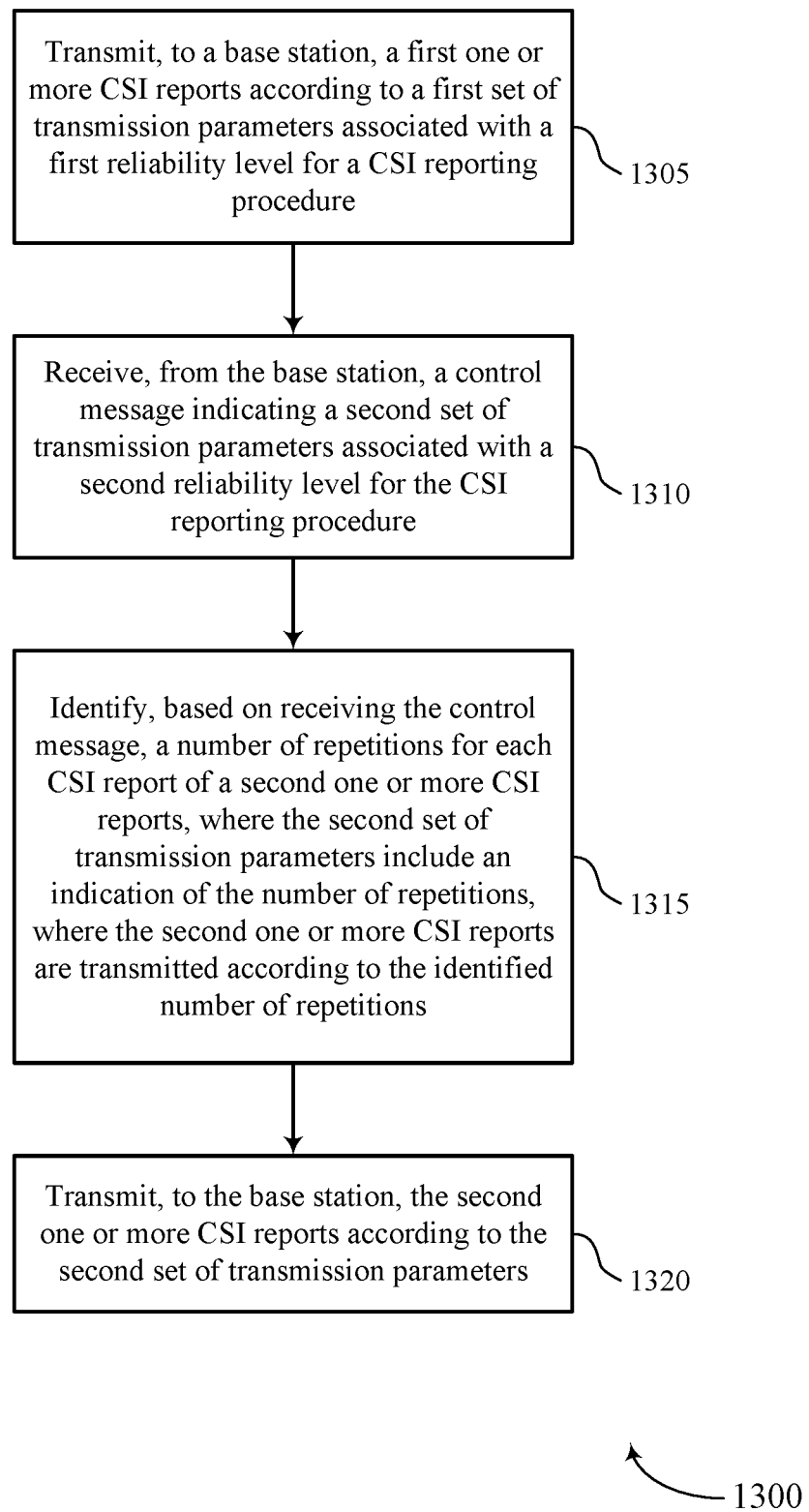

FIG. 13 shows a flowchart illustrating a method 1300 that supports dynamic adaptation of a semi-persistent CSI report setting in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may transmit, to a base station, a first one or more CSI reports according to a first set of transmission parameters associated with a first reliability level for a CSI reporting procedure. The operations of 1305 may be performed according to the methods described herein. In some examples, aspects of the operations of 1305 may be performed by a CSI report manager as described with reference to FIGS. 4 through 7.

At 1310, the UE may receive, from the base station, a control message indicating a second set of transmission parameters associated with a second reliability level for the CSI reporting procedure. The operations of 1310 may be performed according to the methods described herein. In some examples, aspects of the operations of 1310 may be performed by a control signaling manager as described with reference to FIGS. 4 through 7.

At 1315, the UE may identify, based on receiving the control message, a number of repetitions for each CSI report of a second one or more CSI reports, where the second set of transmission parameters include an indication of the number of repetitions, where the second one or more CSI reports are transmitted according to the identified number of repetitions. The operations of 1315 may be performed according to the methods described herein. In some examples, aspects of the operations of 1315 may be performed by a repetition manager as described with reference to FIGS. 4 through 7.

At 1320, the UE may transmit, to the base station, the second one or more CSI reports according to the second set of transmission parameters. The operations of 1320 may be performed according to the methods described herein. In some examples, aspects of the operations of 1320 may be performed by a CSI report manager as described with reference to FIGS. 4 through 7.

Figure 14:
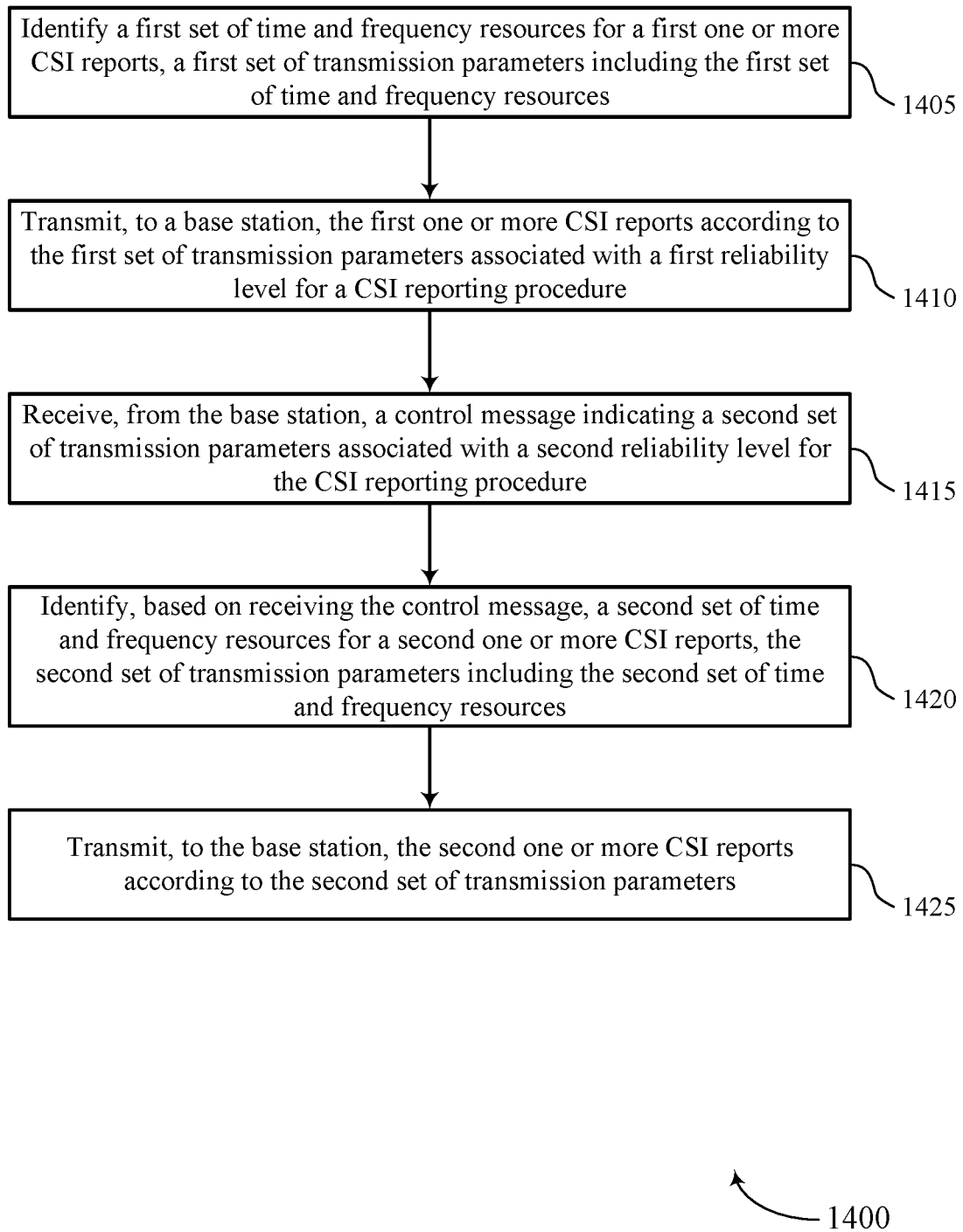

FIG. 14 shows a flowchart illustrating a method 1400 that supports dynamic adaptation of a semi-persistent CSI report setting in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may identify a first set of time and frequency resources for a first one or more CSI reports, a first set of transmission parameters including the first set of time and frequency resources. The operations of 1405 may be performed according to the methods described herein. In some examples, aspects of the operations of 1405 may be performed by a resource manager as described with reference to FIGS. 4 through 7.

At 1410, the UE may transmit, to a base station, the first one or more CSI reports according to the first set of transmission parameters associated with a first reliability level for a CSI reporting procedure. The operations of 1410 may be performed according to the methods described herein. In some examples, aspects of the operations of 1410 may be performed by a CSI report manager as described with reference to FIGS. 4 through 7.

At 1415, the UE may receive, from the base station, a control message indicating a second set of transmission parameters associated with a second reliability level for the CSI reporting procedure. The operations of 1415 may be performed according to the methods described herein. In some examples, aspects of the operations of 1415 may be performed by a control signaling manager as described with reference to FIGS. 4 through 7.

At 1420, the UE may identify, based on receiving the control message, a second set of time and frequency resources for a second one or more CSI reports, the second set of transmission parameters including the second set of time and frequency resources. The operations of 1420 may be performed according to the methods described herein. In some examples, aspects of the operations of 1420 may be performed by a resource manager as described with reference to FIGS. 4 through 7.

At 1425, the UE may transmit, to the base station, the second one or more CSI reports according to the second set of transmission parameters. The operations of 1425 may be performed according to the methods described herein. In some examples, aspects of the operations of 1425 may be performed by a CSI report manager as described with reference to FIGS. 4 through 7.

Figure 15:
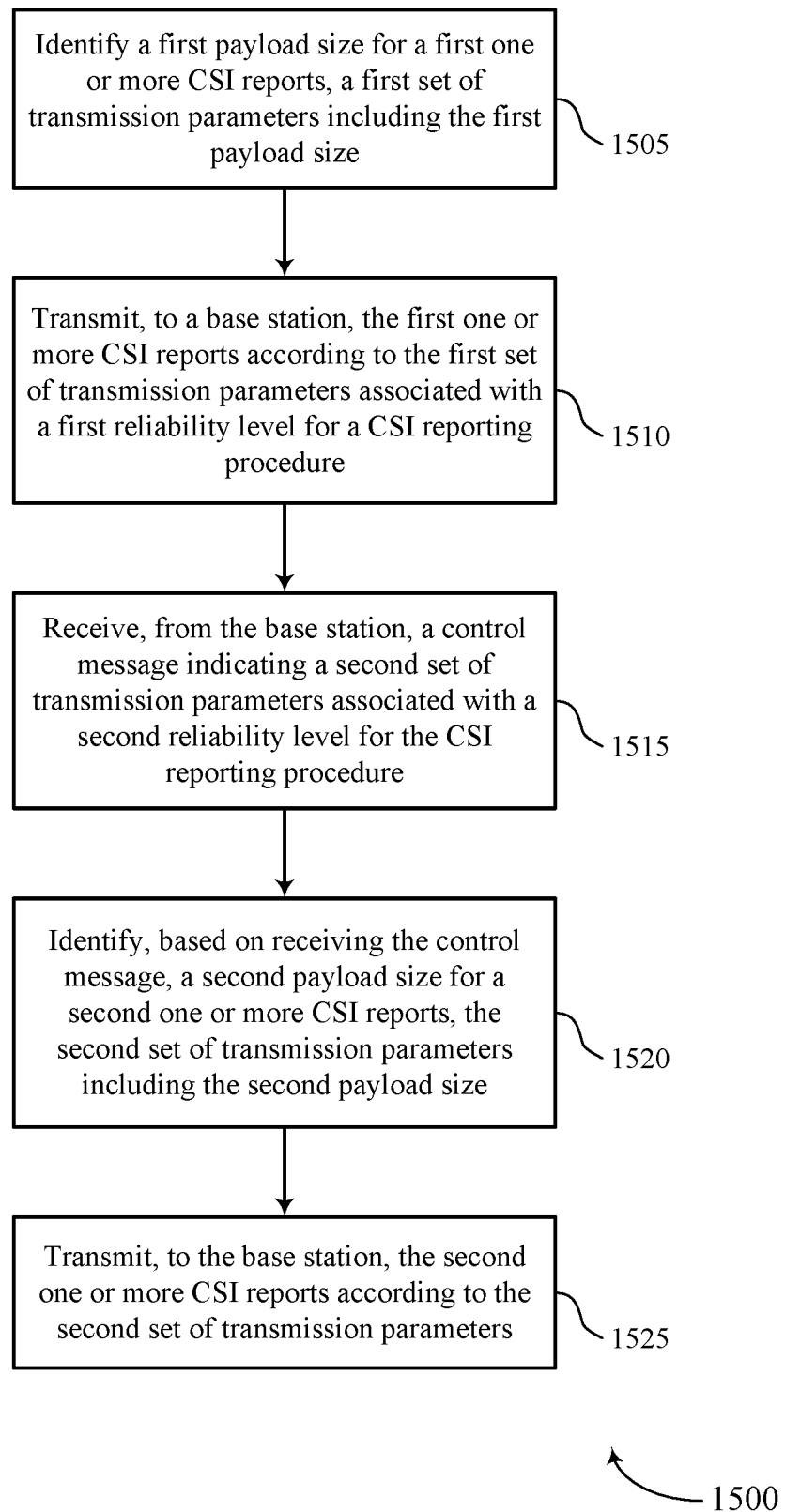

FIG. 15 shows a flowchart illustrating a method 1500 that supports dynamic adaptation of a semi-persistent CSI report setting in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1505, the UE may identify a first payload size for a first one or more CSI reports, a first set of transmission parameters including the first payload size. The operations of 1505 may be performed according to the methods described herein. In some examples, aspects of the operations of 1505 may be performed by a payload manager as described with reference to FIGS. 4 through 7.

At 1510, the UE may transmit, to a base station, the first one or more CSI reports according to the first set of transmission parameters associated with a first reliability level for a CSI reporting procedure. The operations of 1510 may be performed according to the methods described herein. In some examples, aspects of the operations of 1510 may be performed by a CSI report manager as described with reference to FIGS. 4 through 7.

At 1515, the UE may receive, from the base station, a control message indicating a second set of transmission parameters associated with a second reliability level for the CSI reporting procedure. The operations of 1515 may be performed according to the methods described herein. In some examples, aspects of the operations of 1515 may be performed by a control signaling manager as described with reference to FIGS. 4 through 7.

At 1520, the UE may identify, based on receiving the control message, a second payload size for a second one or more CSI reports, the second set of transmission parameters including the second payload size. The operations of 1520 may be performed according to the methods described herein. In some examples, aspects of the operations of 1520 may be performed by a payload manager as described with reference to FIGS. 4 through 7.

At 1525, the UE may transmit, to the base station, the second one or more CSI reports according to the second set of transmission parameters. The operations of 1525 may be performed according to the methods described herein. In some examples, aspects of the operations of 1525 may be performed by a CSI report manager as described with reference to FIGS. 4 through 7.

Figure 16:
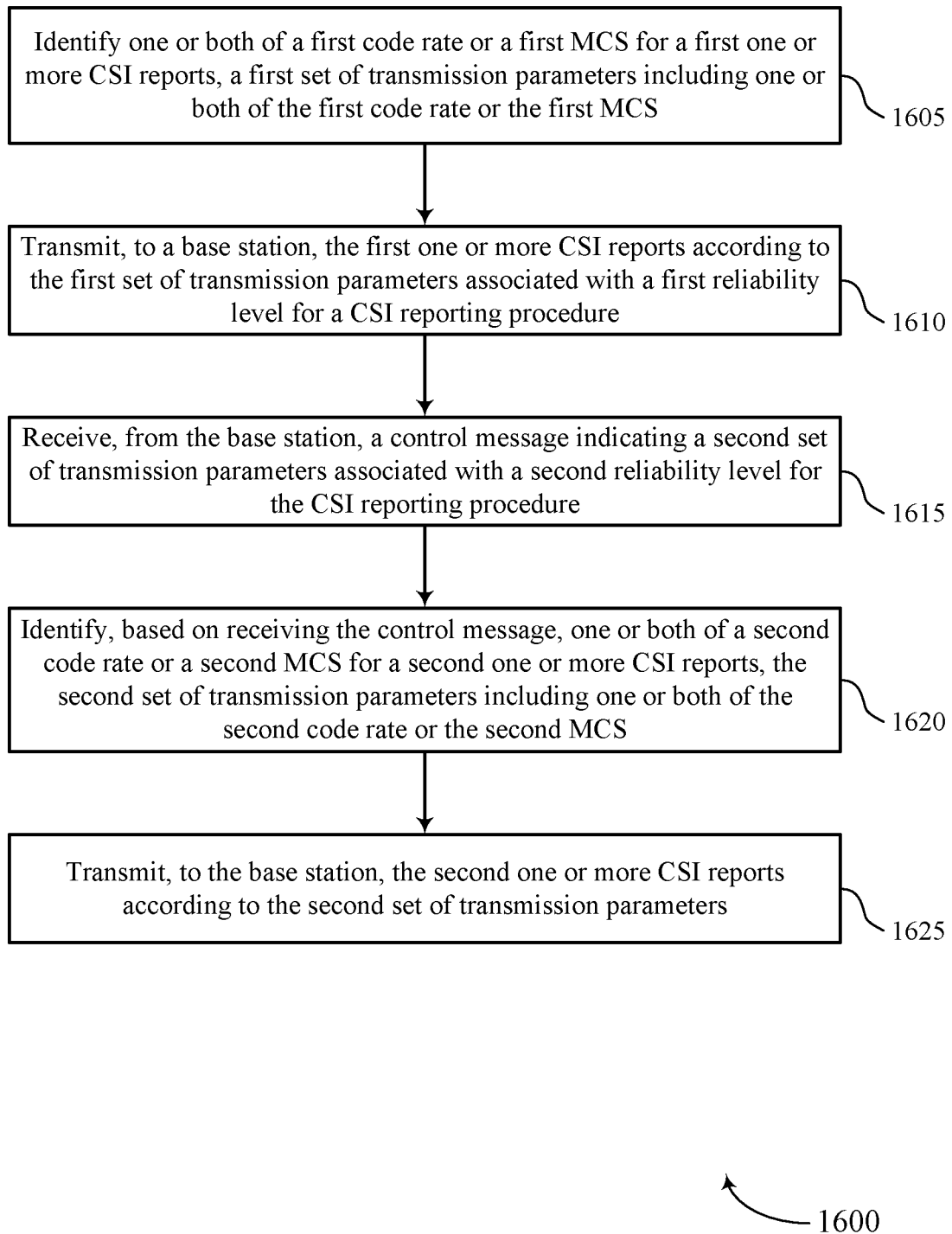

FIG. 16 shows a flowchart illustrating a method 1600 that supports dynamic adaptation of a semi-persistent CSI report setting in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1605, the UE may identify one or both of a first code rate or a first MCS for a first one or more CSI reports, a first set of transmission parameters including one or both of the first code rate or the first MCS. The operations of 1605 may be performed according to the methods described herein. In some examples, aspects of the operations of 1605 may be performed by an MCS manager as described with reference to FIGS. 4 through 7.

At 1610, the UE may transmit, to a base station, the first one or more CSI reports according to the first set of transmission parameters associated with a first reliability level for a CSI reporting procedure. The operations of 1610 may be performed according to the methods described herein. In some examples, aspects of the operations of 1610 may be performed by a CSI report manager as described with reference to FIGS. 4 through 7.

At 1615, the UE may receive, from the base station, a control message indicating a second set of transmission parameters associated with a second reliability level for the CSI reporting procedure. The operations of 1615 may be performed according to the methods described herein. In some examples, aspects of the operations of 1615 may be performed by a control signaling manager as described with reference to FIGS. 4 through 7.

At 1620, the UE may identify, based on receiving the control message, one or both of a second code rate or a second MCS for a second one or more CSI reports, the second set of transmission parameters including one or both of the second code rate or the second MCS. The operations of 1620 may be performed according to the methods described herein. In some examples, aspects of the operations of 1620 may be performed by an MCS manager as described with reference to FIGS. 4 through 7.

At 1625, the UE may transmit, to the base station, the second one or more CSI reports according to the second set of transmission parameters. The operations of 1625 may be performed according to the methods described herein. In some examples, aspects of the operations of 1625 may be performed by a CSI report manager as described with reference to FIGS. 4 through 7.

Figure 17:
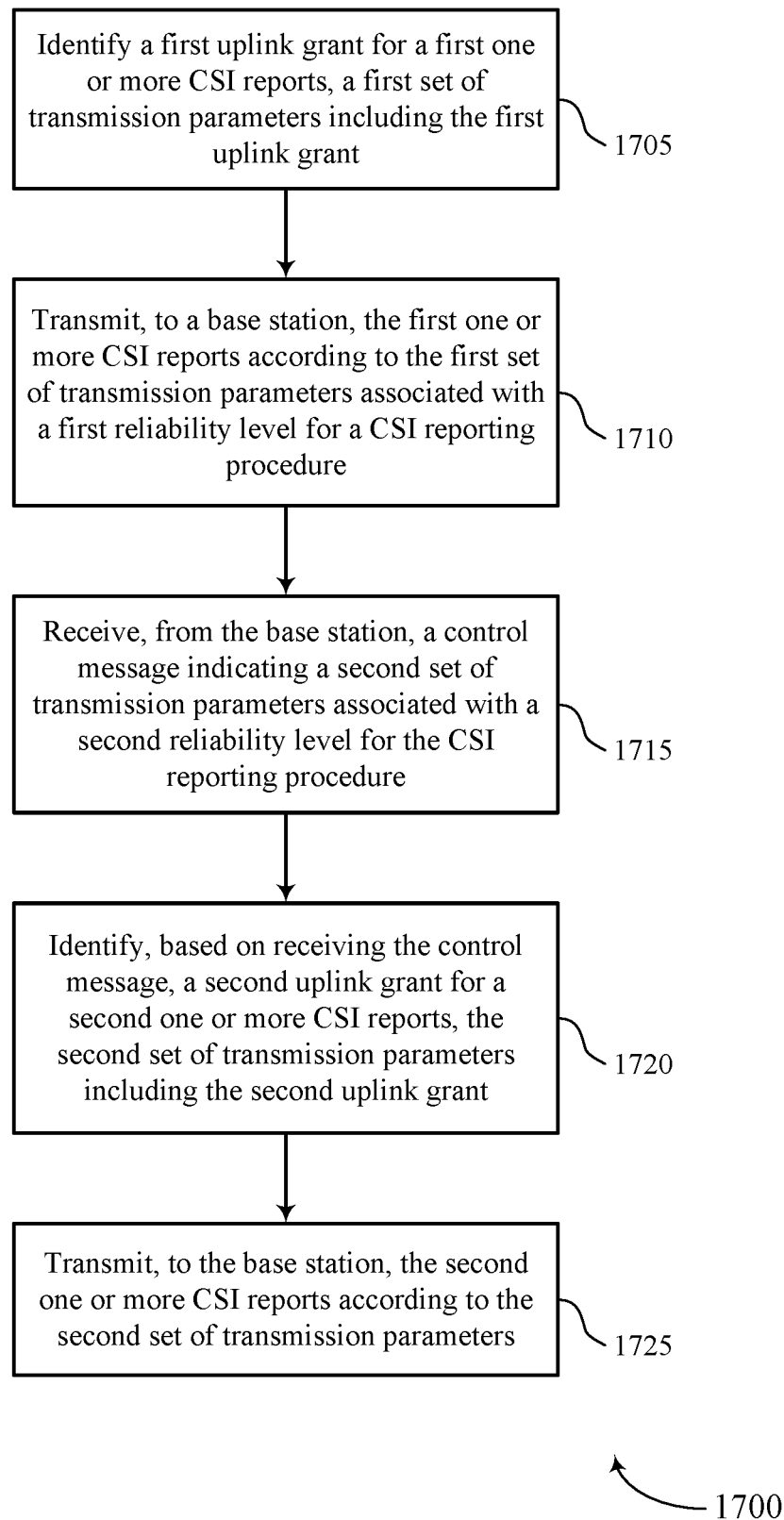

FIG. 17 shows a flowchart illustrating a method 1700 that supports dynamic adaptation of a semi-persistent CSI report setting in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1705, the UE may identify a first uplink grant for a first one or more CSI reports, a first set of transmission parameters including the first uplink grant. The operations of 1705 may be performed according to the methods described herein. In some examples, aspects of the operations of 1705 may be performed by an uplink manager as described with reference to FIGS. 4 through 7.

At 1710, the UE may transmit, to a base station, the first one or more CSI reports according to the first set of transmission parameters associated with a first reliability level for a CSI reporting procedure. The operations of 1710 may be performed according to the methods described herein. In some examples, aspects of the operations of 1710 may be performed by a CSI report manager as described with reference to FIGS. 4 through 7.

At 1715, the UE may receive, from the base station, a control message indicating a second set of transmission parameters associated with a second reliability level for the CSI reporting procedure. The operations of 1715 may be performed according to the methods described herein. In some examples, aspects of the operations of 1715 may be performed by a control signaling manager as described with reference to FIGS. 4 through 7.

At 1720, the UE may identify, based on receiving the control message, a second uplink grant for a second one or more CSI reports, the second set of transmission parameters including the second uplink grant. The operations of 1720 may be performed according to the methods described herein. In some examples, aspects of the operations of 1720 may be performed by an uplink manager as described with reference to FIGS. 4 through 7.

At 1725, the UE may transmit, to the base station, the second one or more CSI reports according to the second set of transmission parameters. The operations of 1725 may be performed according to the methods described herein. In some examples, aspects of the operations of 1725 may be performed by a CSI report manager as described with reference to FIGS. 4 through 7.

Figure 18:
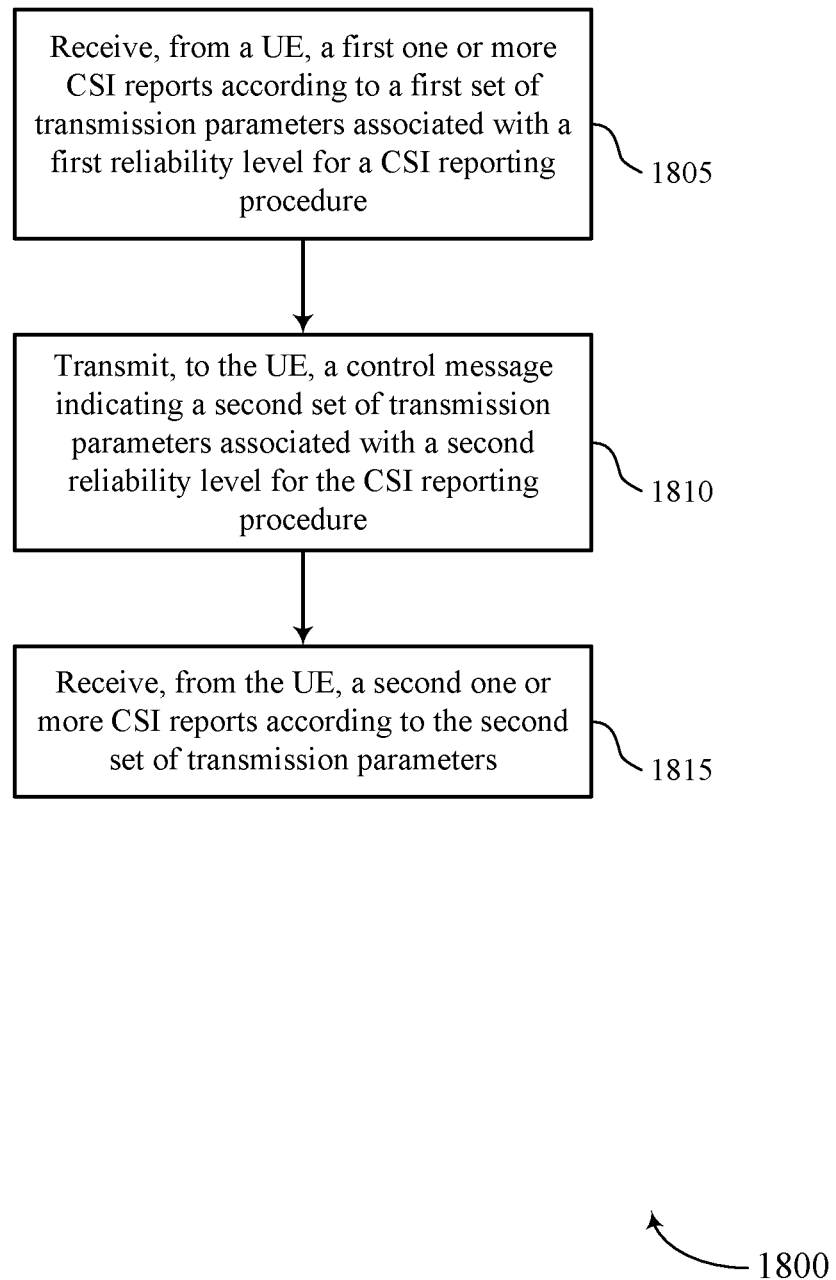

FIG. 18 shows a flowchart illustrating a method 1800 that supports dynamic adaptation of a semi-persistent CSI report setting in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a UE, a first one or more CSI reports according to a first set of transmission parameters associated with a first reliability level for a CSI reporting procedure. The operations of 1805 may be performed according to the methods described herein. In some examples, aspects of the operations of 1805 may be performed by a CSI report manager as described with reference to FIGS. 8 through 11.

At 1810, the base station may transmit, to the UE, a control message indicating a second set of transmission parameters associated with a second reliability level for the CSI reporting procedure. The operations of 1810 may be performed according to the methods described herein. In some examples, aspects of the operations of 1810 may be performed by a control signaling manager as described with reference to FIGS. 8 through 11.

At 1815, the base station may receive, from the UE, a second one or more CSI reports according to the second set of transmission parameters. The operations of 1815 may be performed according to the methods described herein. In some examples, aspects of the operations of 1815 may be performed by a CSI report manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting, to a base station, a first one or more CSI reports according to a first set of transmission parameters associated with a first reliability level for a CSI reporting procedure; receiving, from the base station, a control message indicating a second set of transmission parameters associated with a second reliability level for the CSI reporting procedure; and transmitting, to the base station, a second one or more CSI reports according to the second set of transmission parameters.

Aspect 2: The method of aspect 1, further comprising: identifying, based at least in part on receiving the control message, a number of repetitions for each CSI report of the second one or more CSI reports, wherein the second set of transmission parameters comprise an indication of the number of repetitions, wherein the second one or more CSI reports are transmitted according to the identified number of repetitions.

Aspect 3: The method of aspect 2, wherein identifying the number of repetitions comprises: identifying the number of repetitions for each CSI report of the second one or more CSI reports based at least in part on a bit value, wherein the indication of the number of repetitions comprises the bit value.

Aspect 4: The method of aspect 3, wherein a first value of the bit value corresponds to a first configuration associated with a first number of repetitions; and a second value of the bit value corresponds to a second configuration associated with a second number of repetitions.

Aspect 5: The method of any of aspects 2 through 4, wherein identifying the number of repetitions comprises: identifying the number of repetitions for each CSI report of the second one or more CSI reports based at least in part on an index value, wherein the indication of the number of repetitions comprises the index value.

Aspect 6: The method of aspect 5, further comprising: identifying, based at least in part on the index value, an entry of a table stored at the UE, wherein identifying the number of repetitions for each CSI report of the second one or more CSI reports is based at least in part on identifying the entry to the table.

Aspect 7: The method of aspect 6, wherein the table comprises a set of entries, each entry of the set of entries corresponding to a different number of repetitions.

Aspect 8: The method of any of aspects 6 through 7, further comprising: receiving, from the base station, the table via RRC signaling, or signaling associated with activating the CSI reporting procedure, or in the control message.

Aspect 9: The method of any of aspects 6 through 8, wherein the table is pre-configured at the UE.

Aspect 10: The method of any of aspects 2 through 9, wherein identifying the number of repetitions comprises: identifying the number of repetitions for each CSI report of the second one or more CSI reports based at least in part on a number of bits, wherein the indication of the number of repetitions comprises the number of bits.

Aspect 11: The method of any of aspects 1 through 10, further comprising: identifying a first set of time and frequency resources for the first one or more CSI reports, the first set of transmission parameters comprising the first set of time and frequency resources; and identifying, based at least in part on receiving the control message, a second set of time and frequency resources for the second one or more CSI reports, the second set of transmission parameters comprising the second set of time and frequency resources.

Aspect 12: The method of aspect 11, wherein transmitting the second one or more CSI reports comprises: transmitting the second one or more CSI reports using the first set of time and frequency resources and the second set of time and frequency resources, wherein the second set of time and frequency resources are an additional set of time and frequency resources for the second one or more CSI reports.

Aspect 13: The method of any of aspects 11 through 12, wherein transmitting the second one or more CSI reports comprises: transmitting the second one or more CSI reports using the second set of time and frequency resources without using the first set of time and frequency resources, wherein the second set of time and frequency resources are an alternative set of time and frequency resources for the second one or more CSI reports.

Aspect 14: The method of aspect 13, wherein a first size of the first set of time and frequency resources is less than a second size of the second set of time and frequency resources.

Aspect 15: The method of any of aspects 1 through 14, further comprising: identifying a first payload size for the first one or more CSI reports, the first set of transmission parameters comprising the first payload size; and identifying, based at least in part on receiving the control message, a second payload size for the second one or more CSI reports, the second set of transmission parameters comprising the second payload size.

Aspect 16: The method of any of aspects 1 through 15, further comprising: identifying one or both of a first code rate or a first MCS for the first one or more CSI reports, the first set of transmission parameters comprising one or both of the first code rate or the first MCS; and identifying, based at least in part on receiving the control message, one or both of a second code rate or a second MCS for the second one or more CSI reports, the second set of transmission parameters comprising one or both of the second code rate or the second MCS.

Aspect 17: The method of any of aspects 1 through 16, further comprising: identifying a first uplink grant for the first one or more CSI reports, the first set of transmission parameters comprising the first uplink grant; and identifying, based at least in part on receiving the control message, a second uplink grant for the second one or more CSI reports, the second set of transmission parameters comprising the second uplink grant.

Aspect 18: The method of aspect 17, further comprising: identifying, based at least in part on receiving the control message, a number of repetitions for each CSI report of the second one or more CSI reports, wherein the second set of transmission parameters comprise an indication of the number of repetitions; and transmitting the second one or more CSI reports according to the number of repetitions using the second uplink grant.

Aspect 19: The method of any of aspects 17 through 18, further comprising: receiving, from the base station, signaling indicating one or more uplink grants comprising at least the second uplink grant; and identifying the second uplink grant from the one or more uplink grants based at least in part on an indication received from the base station.

Aspect 20: The method of aspect 19, wherein the one or more uplink grants are received via RRC signaling.

Aspect 21: The method of any of aspects 19 through 20, further comprising: receiving, from the base station, the indication via the control message.

Aspect 22: The method of any of aspects 19 through 21, further comprising: receiving, from the base station, the indication via signaling associated with activating the CSI reporting procedure.

Aspect 23: The method of any of aspects 19 through 22, further comprising: receiving, from the base station, the indication via higher layer signaling associated with configuring the CSI reporting procedure.

Aspect 24: The method of any of aspects 19 through 23, wherein the indication comprises an index value corresponding to the second uplink grant.

Aspect 25: The method of any of aspects 17 through 24, wherein the second uplink grant is different than the first uplink grant.

Aspect 26: The method of any of aspects 1 through 25, wherein the control message comprises DCI or a MAC-CE.

Aspect 27: The method of any of aspects 1 through 26, wherein the control message triggers a coverage enhancement mode at the UE.

Aspect 28: The method of any of aspects 1 through 27, wherein the CSI reporting procedure comprises semi-persistent CSI reporting.

Aspect 29: The method of aspect 28, wherein the control message is received during a time duration configured for the semi-persistent CSI reporting.

Aspect 30: The method of any of aspects 1 through 29, wherein the CSI reporting procedure is part of a beam management procedure.

Aspect 31: A method for wireless communications at a base station, comprising: receiving, from a UE, a first one or more CSI reports according to a first set of transmission parameters associated with a first reliability level for a CSI reporting procedure; transmitting, to the UE, a control message indicating a second set of transmission parameters associated with a second reliability level for the CSI reporting procedure; and receiving, from the UE, a second one or more CSI reports according to the second set of transmission parameters.

Aspect 32: The method of aspect 31, further comprising: identifying a number of repetitions for each CSI report of the second one or more CSI reports, wherein the second set of transmission parameters comprise an indication of the number of repetitions, and the second one or more CSI reports are received according to the number of repetitions.

Aspect 33: The method of aspect 32, wherein identifying the number of repetitions comprises: identifying a bit value indicating the number of repetitions for each CSI report of the second one or more CSI reports, wherein the indication of the number of repetitions comprises the bit value.

Aspect 34: The method of aspect 33, wherein a first value of the bit value corresponds to a first configuration associated with a first number of repetitions; and a second value of the bit value corresponds to a second configuration associated with a second number of repetitions.

Aspect 35: The method of any of aspects 32 through 34, wherein identifying the number of repetitions comprises: identifying an index value indicating the number of repetitions for each CSI report of the second one or more CSI reports, wherein the indication of the number of repetitions comprises the index value.

Aspect 36: The method of aspect 35, wherein the index value corresponds to an entry of a table stored at the UE, the table comprising a set of entries corresponding to different numbers of repetitions.

Aspect 37: The method of aspect 36, further comprising: transmitting, to the UE, the table via RRC signaling, or signaling associated with activating the CSI reporting procedure, or in the control message.

Aspect 38: The method of any of aspects 32 through 37, further comprising: identifying a number of bits indicating the number of repetitions for each CSI report of the second one or more CSI reports, wherein the indication of the number of repetitions comprises the number of bits.

Aspect 39: The method of any of aspects 31 through 38, further comprising: identifying a first set of time and frequency resources for the first one or more CSI reports, the first set of transmission parameters comprising the first set of time and frequency resources; and identifying a second set of time and frequency resources for the second one or more CSI reports, the second set of transmission parameters comprising the second set of time and frequency resources.

Aspect 40: The method of aspect 39, wherein receiving the second one or more CSI reports comprises: receiving the second one or more CSI reports using the first set of time and frequency resources and the second set of time and frequency resources, wherein the second set of time and frequency resources are an additional set of time and frequency resources for the second one or more CSI reports.

Aspect 41: The method of any of aspects 39 through 40, wherein receiving the second one or more CSI reports comprises: receiving the second one or more CSI reports using the second set of time and frequency resources without using the first set of time and frequency resources, wherein the second set of time and frequency resources are an alternative set of time and frequency resources for the second one or more CSI reports.

Aspect 42: The method of aspect 41, wherein a first size of the first set of time and frequency resources is less than a second size of the second set of time and frequency resources.

Aspect 43: The method of any of aspects 31 through 42, further comprising: identifying a first payload size for the first one or more CSI reports, the first set of transmission parameters comprising the first payload size; and identifying a second payload size for the second one or more CSI reports, the second set of transmission parameters comprising the second payload size.

Aspect 44: The method of any of aspects 31 through 43, further comprising: identifying one or both of a first code rate or a first MCS for the first one or more CSI reports, the first set of transmission parameters comprising one or both of the first code rate or the first MCS; and identifying one or both of a second code rate or a second MCS for the second one or more CSI reports, the second set of transmission parameters comprising one or both of the second code rate or the second MCS.

Aspect 45: The method of any of aspects 31 through 44, further comprising: identifying a first uplink grant for the first one or more CSI reports, the first set of transmission parameters comprising the first uplink grant; and identifying a second uplink grant for the second one or more CSI reports, the second set of transmission parameters comprising the second uplink grant.

Aspect 46: The method of aspect 45, further comprising: identifying a number of repetitions for each CSI report of the second one or more CSI reports, wherein the second set of transmission parameters comprise an indication of the number of repetitions; and receiving the second one or more CSI reports according to the number of repetitions using the second uplink grant.

Aspect 47: The method of any of aspects 45 through 46, further comprising: transmitting, to the UE, signaling indicating one or more uplink grants comprising at least the second uplink grant; and transmitting, to the UE, an indication of the second uplink grant of the one or more uplink grants.

Aspect 48: The method of aspect 47, wherein the one or more uplink grants are transmitted via RRC signaling.

Aspect 49: The method of any of aspects 47 through 48, further comprising: transmitting, to the UE, the indication via the control message.

Aspect 50: The method of any of aspects 47 through 49, further comprising: transmitting, to the UE, the indication via signaling associated with activating the CSI reporting procedure.

Aspect 51: The method of any of aspects 47 through 50, further comprising: transmitting, to the UE, the indication via higher layer signaling associated with configuring the CSI reporting procedure.

Aspect 52: The method of any of aspects 47 through 51, wherein the indication comprises an index value corresponding to the second uplink grant.

Aspect 53: The method of any of aspects 45 through 52, wherein the second uplink grant is different than the first uplink grant.

Aspect 54: The method of any of aspects 31 through 53, wherein the control message comprises DCI or a MAC-CE.

Aspect 55: The method of any of aspects 31 through 54, wherein the control message triggers a coverage enhancement mode at the UE.

Aspect 56: The method of any of aspects 31 through 55, wherein the CSI reporting procedure comprises semi-persistent CSI reporting.

Aspect 57: The method of any of aspects 31 through 56, wherein the control message is received during a time duration configured for the semi-persistent CSI reporting.

Aspect 58: The method of any of aspects 31 through 57, wherein the CSI reporting procedure is part of a beam management procedure.

Aspect 59: An apparatus for wireless communications at a UE, comprising a processor; memory coupled with the processor; and instructions stored in the memory and executable by the processor to cause the apparatus to perform a method of any of aspects 1 through 30.

Aspect 60: An apparatus for wireless communications at a UE, comprising at least one means for performing a method of any of aspects 1 through 30.

Aspect 61: A non-transitory computer-readable medium storing code for wireless communications at a UE, the code comprising instructions executable by a processor to perform a method of any of aspects 1 through 30.

Aspect 62: An apparatus for wireless communications at a base station, comprising a processor; memory coupled with the processor; and instructions stored in the memory and executable by the processor to cause the apparatus to perform a method of any of aspects 31 through 58.

Aspect 63: An apparatus for wireless communications at a base station, comprising at least one means for performing a method of any of aspects 31 through 58.

Aspect 64: A non-transitory computer-readable medium storing code for wireless communications at a base station, the code comprising instructions executable by a processor to perform a method of any of aspects 31 through 58.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, to a network device, a first one or more channel state information (CSI) reports according to a first set of transmission parameters associated with a first reliability level for a CSI reporting procedure;
    receiving, from the network device, a control message indicating a second set of transmission parameters different from the first set of transmission parameters, the second set of transmission parameters associated with a second reliability level for the CSI reporting procedure that is different from the first reliability level, wherein the second set of transmission parameters comprise an indication of a number of repetitions for a second CSI report; and
    transmitting, to the network device, a first transmission of the second CSI report indicating one or more channel measurements and one or more additional transmissions of the second CSI report indicating the one or more channel measurements according to the second set of transmission parameters and the number of repetitions.

2. The method of claim 1, wherein the number of repetitions for the second CSI report is based at least in part on a bit value, and wherein the indication of the number of repetitions comprises the bit value.

3. The method of claim 2, wherein:
    a first value of the bit value corresponds to a first configuration associated with a first number of repetitions; and
    a second value of the bit value corresponds to a second configuration associated with a second number of repetitions.

4. The method of claim 1, wherein the number of repetitions for the second CSI report is based at least in part on an index value, and wherein the indication of the number of repetitions comprises the index value.

5. The method of claim 4, further comprising:
    identifying, based at least in part on the index value, an entry of a table stored at the UE, wherein the number of repetitions for the second CSI report is based at least in part on identifying the entry to the table.

6. The method of claim 5, wherein the table comprises a set of entries, each entry of the set of entries corresponding to a different number of repetitions.

7. The method of claim 1, wherein the number of repetitions for the second CSI report is based at least in part on a number of bits, and wherein the indication of the number of repetitions comprises the number of bits.

8. The method of claim 1, further comprising:
    identifying a first set of time and frequency resources for the first one or more CSI reports, the first set of transmission parameters comprising the first set of time and frequency resources; and
    identifying, based at least in part on receiving the control message, a second set of time and frequency resources for the second CSI report, the second set of transmission parameters comprising the second set of time and frequency resources.

9. The method of claim 8, wherein transmitting the first transmission of the second CSI report and the one or more additional transmissions of the second CSI report comprises:
    transmitting the first transmission of the second CSI report and the one or more additional transmissions of the second CSI report using the first set of time and frequency resources and the second set of time and frequency resources, wherein the second set of time and frequency resources are an additional set of time and frequency resources for the second CSI report.

10. The method of claim 8, wherein transmitting the first transmission of the second CSI report and the one or more additional transmissions of the second CSI report comprises:
    transmitting the first transmission of the second CSI report and the one or more additional transmissions of the second CSI report using the second set of time and frequency resources without using the first set of time and frequency resources, wherein the second set of time and frequency resources are an alternative set of time and frequency resources for the second CSI report.

11. The method of claim 10, wherein a first size of the first set of time and frequency resources is less than a second size of the second set of time and frequency resources.

12. The method of claim 1, further comprising:
    identifying a first payload size for the first one or more CSI reports, the first set of transmission parameters comprising the first payload size; and
    identifying, based at least in part on receiving the control message, a second payload size for the second CSI report, the second set of transmission parameters comprising the second payload size.

13. The method of claim 1, further comprising:
    identifying one or both of a first code rate or a first modulation and coding scheme (MCS) for the first one or more CSI reports, the first set of transmission parameters comprising one or both of the first code rate or the first MCS; and identifying, based at least in part on receiving the control message, one or both of a second code rate or a second MCS for the second CSI report, the second set of transmission parameters comprising one or both of the second code rate or the second MCS.

14. The method of claim 1, further comprising:
identifying a first uplink grant for the first one or more CSI reports, the first set of transmission parameters comprising the first uplink grant; and
identifying, based at least in part on receiving the control message, a second uplink grant for the second CSI report, the second set of transmission parameters comprising the second uplink grant.

15. The method of claim 14, wherein transmitting the first transmission of the second CSI report and the one or more additional transmissions of the second CSI report comprises:
transmitting the first transmission of the second CSI report and the one or more additional transmissions of the second CSI report using the second uplink grant.

16. The method of claim 14, further comprising:
receiving, from the network device, signaling indicating one or more uplink grants comprising at least the second uplink grant; and
identifying the second uplink grant from the one or more uplink grants based at least in part on an indication received from the network device.

17. A method for wireless communications at a network device, comprising:
receiving, from a user equipment (UE), a first one or more channel state information (CSI) reports according to a first set of transmission parameters associated with a first reliability level for a CSI reporting procedure;
transmitting, to the UE, a control message indicating a second set of transmission parameters different from the first set of transmission parameters, the second set of transmission parameters associated with a second reliability level for the CSI reporting procedure that is different from the first reliability level, wherein the second set of transmission parameters comprise an indication of a number of repetitions for a second CSI report; and
receiving, from the UE, a first transmission of the second CSI report indicating one or more channel measurements and one or more additional transmissions of the second CSI report indicating the one or more channel measurements according to the second set of transmission parameters and the number of repetitions.

18. The method of claim 17, wherein the number of repetitions is based at least in part on a bit value indicating the number of repetitions for each CSI report of the second CSI report, and wherein the indication of the number of repetitions comprises the bit value.

19. The method of claim 18, wherein:
a first value of the bit value corresponds to a first configuration associated with a first number of repetitions; and
a second value of the bit value corresponds to a second configuration associated with a second number of repetitions.

20. The method of claim 17, wherein the number of repetitions is based at least in part on an index value indicating the number of repetitions for the second CSI report, and wherein the indication of the number of repetitions comprises the index value.

21. The method of claim 17, wherein the number of repetitions is based at least in part on a number of bits indicating the number of repetitions for the second CSI report, and wherein the indication of the number of repetitions comprises the number of bits.

22. The method of claim 17, further comprising:
identifying a first uplink grant for the first one or more CSI reports, the first set of transmission parameters comprising the first uplink grant; and
identifying a second uplink grant for the second CSI report, the second set of transmission parameters comprising the second uplink grant.

23. The method of claim 22, wherein receiving the first transmission of the second CSI report and the one or more additional transmissions of the second CSI report comprises:
receiving the first transmission of the second CSI report and the one or more additional transmissions of the second CSI report using the second uplink grant.

24. An apparatus for wireless communications at a user equipment (UE), comprising:
one or more processors,
one or more memories coupled with the one or more processors; and
instructions stored in the one or more memories and executable by the one or more processors to cause the apparatus to:
transmit, to a network device, a first one or more channel state information (CSI) reports according to a first set of transmission parameters associated with a first reliability level for a CSI reporting procedure;
receive, from the network device, a control message indicating a second set of transmission parameters different from the first set of transmission parameters, the second set of transmission parameters associated with a second reliability level for the CSI reporting procedure that is different from the first reliability level, wherein the second set of transmission parameters comprise an indication of a number of repetitions for a second CSI report; and
transmit, to the network device, a first transmission of the second CSI report indicating one or more channel measurements and one or more additional transmissions of the second CSI report indicating the one or more channel measurements according to the second set of transmission parameters and the number of repetitions.

25. The apparatus of claim 24, wherein the number of repetitions for the second CSI report is based at least in part on a bit value, and wherein the indication of the number of repetitions comprises the bit value.

26. The apparatus of claim 25, wherein:
a first value of the bit value corresponds to a first configuration associated with a first number of repetitions; and
a second value of the bit value corresponds to a second configuration associated with a second number of repetitions.

27. An apparatus for wireless communications at a network device, comprising:
one or more processors,
one or more memories coupled with the one or more processors; and
instructions stored in the one or more memories and executable by the one or more processors to cause the apparatus to:
receive, from a user equipment (UE), a first one or more channel state information (CSI) reports according to a first set of transmission parameters associated with a first reliability level for a CSI reporting procedure;

transmit, to the UE, a control message indicating a second set of transmission parameters different from the first set of transmission parameters, the second set of transmission parameters associated with a second reliability level for the CSI reporting procedure that is different from the first reliability level, wherein the second set of transmission parameters comprise an indication of a number of repetitions for a second CSI report; and receive, from the UE, a first transmission of the second CSI report indicating one or more channel measurements and one or more additional transmissions of the second CSI report indicating the one or more channel measurements according to the second set of transmission parameters and the number of repetitions.

* * * * *